United States Patent
Choi et al.

(10) Patent No.: US 10,780,419 B2
(45) Date of Patent: Sep. 22, 2020

(54) NON-NOBLE ELEMENT CATALYSTS AND METHODS FOR MAKING

(71) Applicant: The Texas A&M University System, College Station, TX (US)

(72) Inventors: Woongchul Choi, College Station, TX (US); Gang Yang, College Station, TX (US); Choongho Yu, College Station, TX (US)

(73) Assignee: The Texas A&M University System, College Station, TX (US)

( * ) Notice: Subject to any disclaimer, the term of this patent is extended or adjusted under 35 U.S.C. 154(b) by 0 days.

(21) Appl. No.: 16/502,011

(22) Filed: Jul. 2, 2019

(65) Prior Publication Data

US 2019/0336943 A1 Nov. 7, 2019

Related U.S. Application Data

(63) Continuation of application No. 15/531,594, filed as application No. PCT/US2015/062966 on Nov. 30, 2015, now Pat. No. 10,391,475.

(Continued)

(51) Int. Cl.
*B01J 21/18* (2006.01)
*H01M 4/86* (2006.01)
(Continued)

(52) U.S. Cl.
CPC .......... *B01J 21/185* (2013.01); *B01J 23/745* (2013.01); *B01J 35/0033* (2013.01); *C01B 32/16* (2017.08);
(Continued)

(58) Field of Classification Search
CPC .... B01J 21/185; B01J 23/745; B01J 35/0033; H01M 4/8605; H01M 4/8867; H01M 4/90;
(Continued)

(56) References Cited

U.S. PATENT DOCUMENTS 7,189,455 B2 * 3/2007 Wong ..................... B82B 1/00
428/408
7,767,616 B2 * 8/2010 Liu ..................... H01M 4/9008
423/447.3

(Continued)

FOREIGN PATENT DOCUMENTS

EP 2792639 A1 10/2014

OTHER PUBLICATIONS

Chen, Zhu, "Nitrogen-Doped Carbon Materials as Oxygen Reduction Reaction Catalysts for Metal-Air Fuel Cells and Batteries", A thesis presented to the University of Waterloo in fulfillment of the degree of Master of Applied Science in Chemical Engineering, 2012, 138 pages.

(Continued)

*Primary Examiner* — Patricia L. Hailey
(74) *Attorney, Agent, or Firm* — Winstead PC

(57) ABSTRACT

Disclosed are non-noble element compositions of matter, structures, and methods for producing the catalysts that can catalyze oxygen reduction reactions (ORR). The disclosed composition of matter can be comprised of graphitic carbon doped with nitrogen and associated with one or two kinds of transition metals. The disclosed structure is a three dimensional, porous structure comprised of a plurality of the disclosed compositions of matter. The disclosed structure can be fashioned into an electrode of an electrochemical cell to serve as a diffusion layer and also to catalyze an ORR. Two methods are disclosed for producing the disclosed composition of matter and structure. The first method is comprised of two steps, and the second method is comprised of a single step.

15 Claims, 23 Drawing Sheets

Related U.S. Application Data

(60) Provisional application No. 62/085,631, filed on Nov. 30, 2014.

(51) Int. Cl.
  *H01M 4/88* (2006.01)
  *H01M 4/90* (2006.01)
  *B01J 23/745* (2006.01)
  *B01J 35/00* (2006.01)
  *H01M 4/96* (2006.01)
  *C01B 32/16* (2017.01)
  *H01M 12/08* (2006.01)
  *H01M 8/1018* (2016.01)

(52) U.S. Cl.
  CPC ....... *H01M 4/8605* (2013.01); *H01M 4/8867* (2013.01); *H01M 4/90* (2013.01); *H01M 4/96* (2013.01); *H01M 12/08* (2013.01); *H01M 2004/8689* (2013.01); *H01M 2008/1095* (2013.01); *Y02E 60/128* (2013.01)

(58) Field of Classification Search
  CPC ................... H01M 4/96; H01M 12/08; H01M 2004/8689; H01M 2008/1095; Y02E 60/128; C01B 32/16; C01B 32/182
  USPC .......................... 502/185; 977/750, 752, 883
  See application file for complete search history.

(56) References Cited

U.S. PATENT DOCUMENTS

| | | | |
|---|---|---|---|
| 10,391,475 B2* | 8/2019 | Yu | B01J 23/745 |
| 2010/0048380 A1* | 2/2010 | Calabrese Barton | H01M 4/881 502/5 |
| 2010/0183950 A1* | 7/2010 | Dai | H01B 1/24 429/513 |
| 2010/0276644 A1* | 11/2010 | Wolf | B01J 23/002 252/512 |
| 2011/0229766 A1 | 9/2011 | Ozaki et al. | |
| 2011/0287174 A1* | 11/2011 | Calabrese Barton | H01M 4/8807 427/115 |
| 2012/0234694 A1* | 9/2012 | Vecitis | B01D 39/2055 205/747 |
| 2014/0199546 A1* | 7/2014 | Sun | C01B 32/16 428/367 |
| 2014/0286852 A1* | 9/2014 | Nicholas | B82Y 40/00 423/447.3 |
| 2017/0022587 A1* | 1/2017 | Adu | C01B 32/17 |

OTHER PUBLICATIONS

Liu et al., "Synthesis of three-dimensional graphene from petroleum asphalt by chemical vapor deposition", Materials Letters, vol. 122, 2014, pp. 285-288.

* cited by examiner

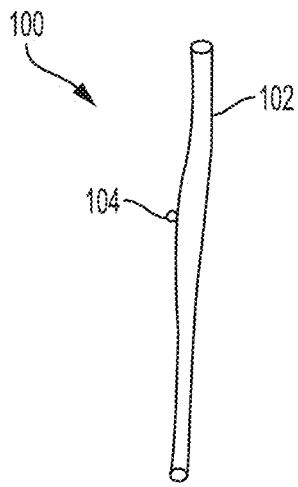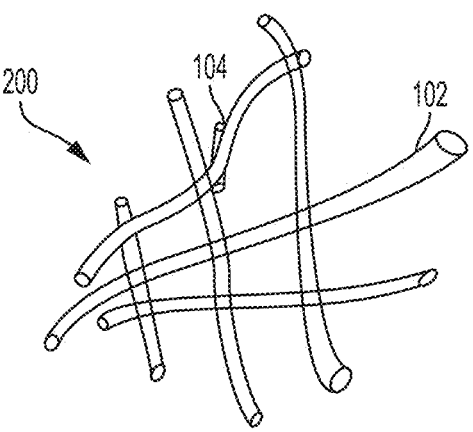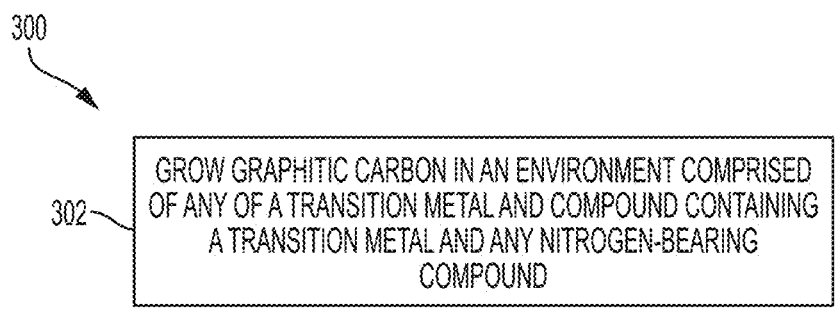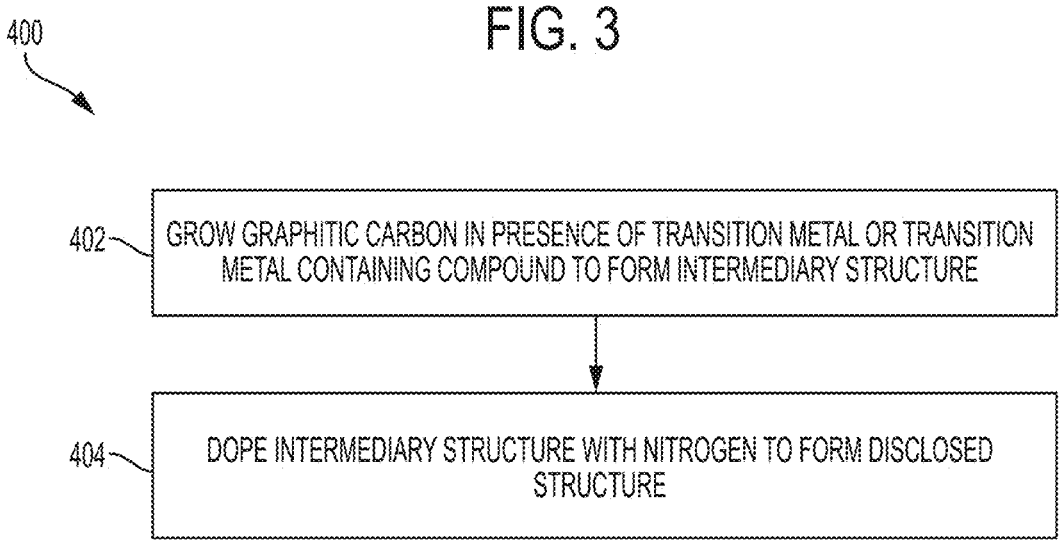

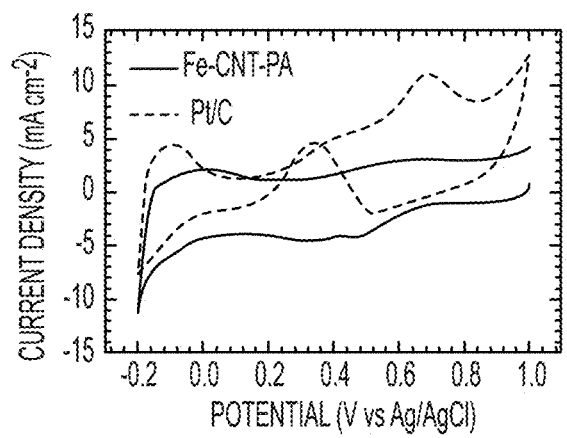 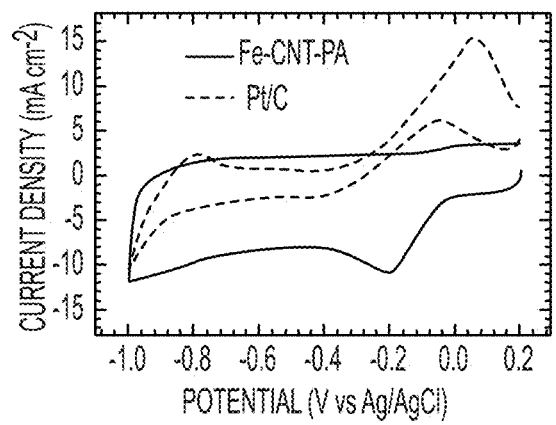
FIG. 14A
FIG. 14B
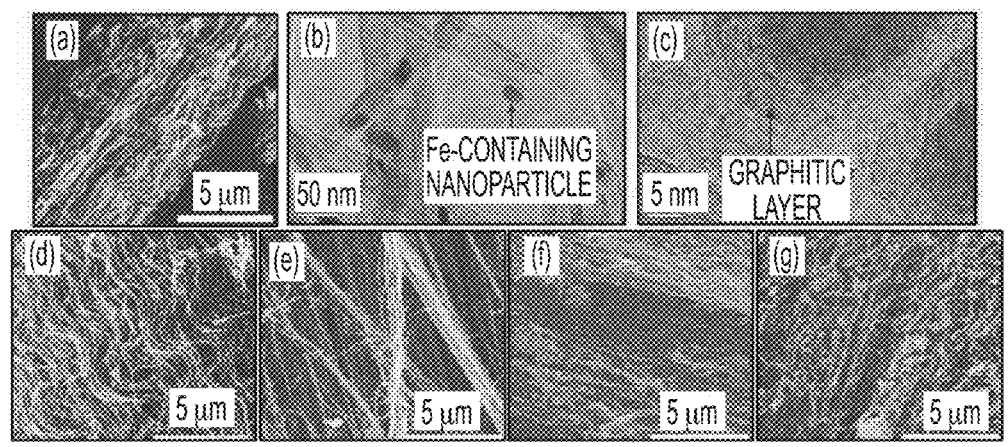
FIG. 15

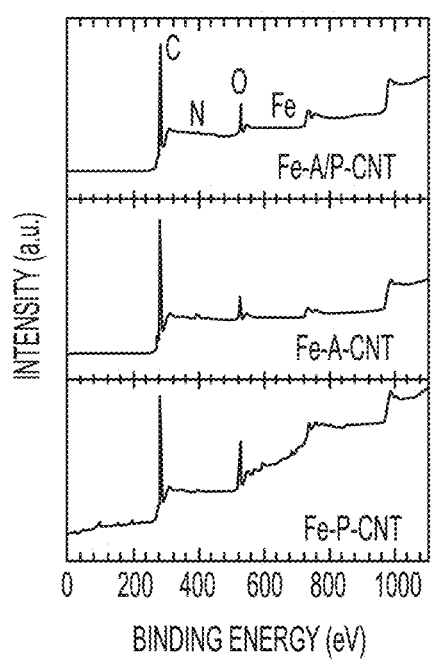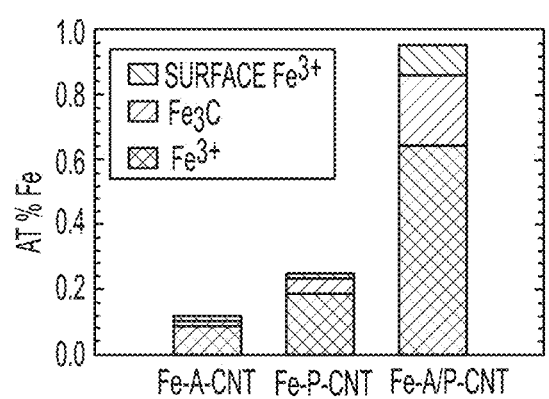
FIG. 20A
FIG. 20B

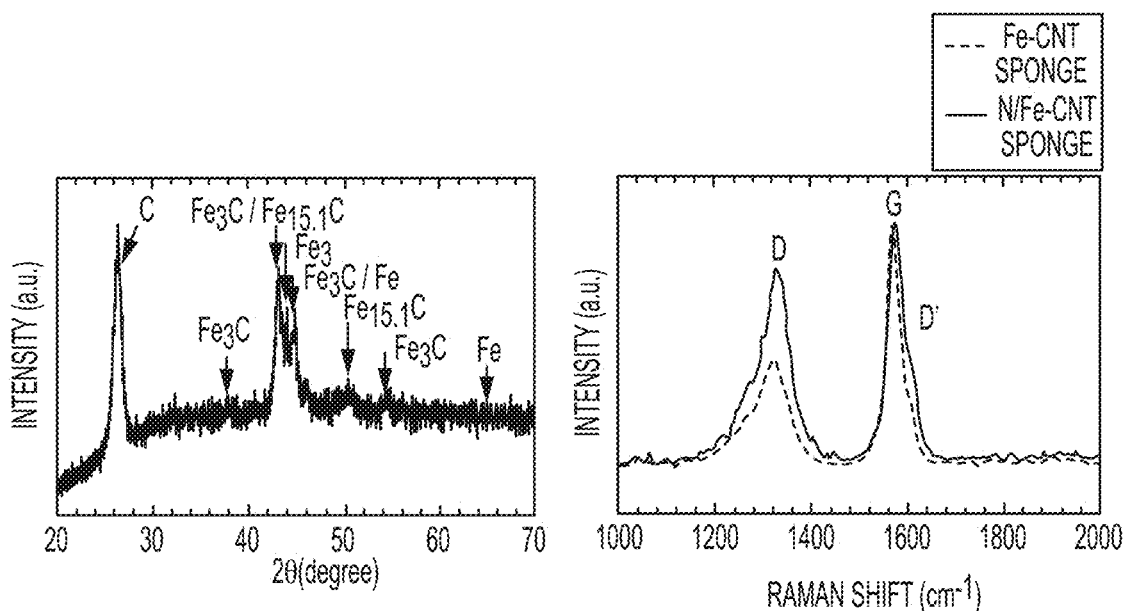
FIG. 22A
FIG. 22B
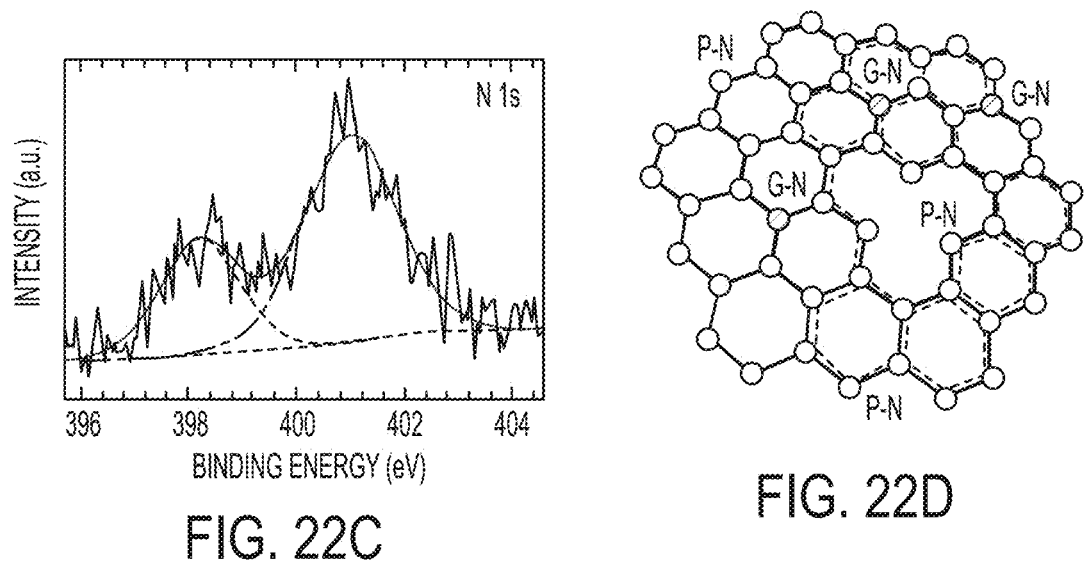
FIG. 22C
FIG. 22D

NON-NOBLE ELEMENT CATALYSTS AND METHODS FOR MAKING

CROSS REFERENCES TO RELATED APPLICATIONS

This application is a continuation of application Ser. No. 15/531,594 filed May 30, 2017, which is a national stage application under 35 U.S.C. § 371 of PCT/US2015/062966 filed Nov. 30, 2015, which claims the benefit under 35 U.S.C. § 119(e) of U.S. Provisional Patent Application No. 62/085,631, filed Nov. 30, 2014, all of which are incorporated herein by reference in their entirety as if fully set forth herein.

STATEMENT REGARDING FEDERALLY SPONSORED RESEARCH OR DEVELOPMENT

This invention was made with government support under Grant No. 1030958 awarded by the National Science Foundation. The government has certain rights in the invention.

BACKGROUND

The oxygen reduction reaction (ORR) is essential in various electrochemical energy conversion processes. However, due to the slow kinetics of the ORR, the use of catalysts comprised of noble elements, such as platinum or platinum alloys, is often desirable. These noble element catalysts are expensive, diminishing the economic viability of electrochemical cells. Replacing noble element catalysts with a less expensive alternative is desirable. Although their high catalytic activity has been hardly challenged, the high price of the precious metal has limited their wide applications.

SUMMARY

Disclosed are compositions of matter and structures for catalyzing ORR that lack noble elements such as platinum. Also disclosed are methods for producing the disclosed compositions of matter and structures. The disclosed methods can economically produce large quantities of the disclosed compositions of matter and structures.

The disclosed composition of matter comprises a transition metal and graphitic carbon doped with nitrogen. In one embodiment, the transition metal is iron. The transition metal might be coordinated with the nitrogen. The graphitic carbon can be single or multi-walled carbon nanotubes. Single or multi-walled carbon nanotubes are referred to as CNTs. CNTs that contain iron are referred to as Fe-CNT. In some embodiments, the Fe-CNTs are doped with nitrogen from a polyaniline source. These are referred to as Fe-CNT-PA. In other embodiments, Fe-CNTs are doped with nitrogen from a pyridine source. These are referred to as Fe-CNT-Py.

A disclosed composition of matter comprises a transition metal and graphitic carbon doped with nitrogen. The graphitic carbon can be graphene or one or more carbon nanotubes. The one or more carbon nanotubes can be single or multi-walled carbon nanotubes. The transition metal can be iron. The transition metal also can be other transition metals such as cobalt. The transition metal might be coordinated with nitrogen.

A disclosed structure is comprised of a plurality of the disclosed composition of matter. The structure can be a porous, three-dimensional structure comprised of a plurality of a transition metal and graphitic carbon doped with nitrogen. The graphitic carbon can be graphene or carbon nanotubes. The carbon nanotubes can be single walled or multi-walled carbon nanotubes. The disclosed structure is stable in acidic or basic solutions. The disclosed structure can catalyze an ORR. The disclosed structure can form a self-standing electrode of an electrochemical cell, thereby acting as a gas diffusion layer.

A first disclosed method for producing the disclosed structure comprises growing graphitic carbon in an environment comprised of a transition metal and any nitrogen source. The transition metal can be iron. The nitrogen source can be any of pyridine and aniline. The graphitic carbon can be grown through chemical vapor deposition (CVD), and the graphitic carbon can include any of graphene or carbon nanotubes. The carbon nanotubes can be single or multi-walled carbon nanotubes.

A second disclosed method for producing the disclosed structure comprises growing graphitic carbon in the presence of a transition metal or a compound containing a transition metal to produce an intermediary structure, and doping the intermediary structure with nitrogen. The graphitic carbon can be grown through CVD, and the graphitic carbon can include any of graphene or carbon nanotubes. The carbon nanotubes can be single or multi-walled carbon nanotubes.

A disclosed composition, structure, and method for creating a microbial fuel cell (MFC) comprise three-dimensional nitrogen-enriched iron-coordinated CNT (N/Fe-CNT) sponges. CVD is used to synthesize a self-assembled 3D framework comprising intertwined nitrogen-enriched CNTs. The synthesized nitrogen-enriched CNTs are implemented as cathodes within MFC.

BRIEF DESCRIPTION OF THE DRAWINGS

FIG. 1 depicts the disclosed composition of matter;

FIG. 2 depicts the disclosed structure comprised of a plurality of the disclosed composition of matter;

FIG. 3 depicts a first method for making the disclosed composition of matter and structure;

FIG. 4 depicts a second method for making the disclosed composition of matter and structure;

FIGS. 14A and 14B are graphs of CV tests of Fe-CNT-PA and Pt/C in $O_2$-saturated 0.5M $H_2SO_4$ and 0.1M KOH, respectively, in the presence of 1.0 M methanol;

FIG. 15 shows SEM and TEM images of CNTs; Fe-A/P-CNT (a, b and c); Fe-A-CNT (d); Fe—P-CNT (e); P-A-CNT (f); Fe-CNT (g);

FIG. 20A shows a series of graphs showing results of a survey XPS scan of Fe-A/P-CNT, Fe-A-CNT, and Fe—P-CNT;

FIG. 20B shows a graph showing a comparison of iron atomic concentration of doped carbon nanotubes;

FIG. 22A is a graph showing relative intensity varying 2θ(degree) for C, $Fe_3C/Fe_{15.1}C$, $Fe_3C$, $Fe_3C/Fe$, $Fe_{15.1}C$, $Fe_3C$, and Fe;

FIG. 22B is a graph showing relative intensity according to Raman shift ($cm^{-1}$);

FIG. 22C is a graph showing relative intensity according to binding energy (eV);

FIG. 22D is a schematic representation of nitrogen incorporated graphitic structure;

DETAILED DESCRIPTION OF EXEMPLARY EMBODIMENTS

Figure 5A:
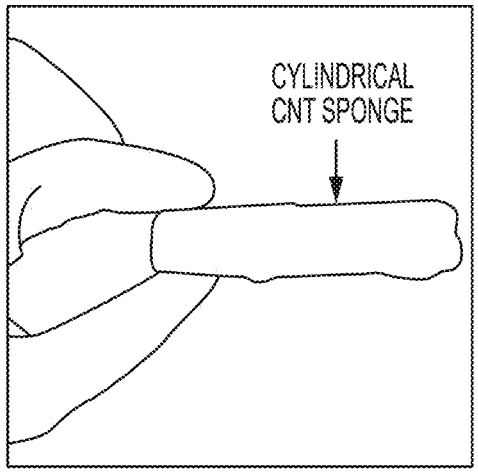
FIG. 5A is a photograph of a cylindrical sponge-like CNT structure.

Nitrogen-doped carbonaceous materials have been reported as alternatives to noble element catalysts due to the relative low cost of carbon and nitrogen precursors. However, the carbon and nitrogen precursors have accompanied with low catalytic activity and poor stability, particularly in acidic media. Disclosed herein is a 3-dimensional (3D) N/Fe-containing carbon nanotube (CNT) sponges showing striking improvements in catalytic activity and stability in both acidic and basic solutions. The onset potential and limiting current densities in 0.5M $H_2SO_4$ and 0.1M KOH were comparable to those of Pt/C (20-wt % Pt). More importantly, cyclic voltammetry (CV) tests up to 30,000 cycles suggest excellent long-term stability of N/Fe-containing CNTs (N/Fe-CNT), even better than Pt/C solutions. A key to achieving this performance of N/Fe-CNT is coordination of pyridinic nitrogen with iron in 3D CNTs. Proper doping, coordination, and morphology design of CNT bulks has been shown to improve performance. A self-standing and porous sponge-like 3D structure, such as the one described herein, facilitates mass transfer for ORR and potentially acts as a gas diffusion layer in electrochemical cells. This unique bi-functionality combined with low cost and high performance could make fuel cells a commercially viable option in the future.

The exact functions of transition metals in nitrogen-doped carbonaceous materials are still under debate. Two main arguments are considered to be most probable. First, transition metals play a role in the ORR either by assisting the adsorption of oxygen or electron transfer from the electrode to oxygen. Second, transition metals neither participate in the catalytic reaction nor become part of catalytically active sites, but they assist the formation of nitrogen-doped carbon nanostructures during nitrogen incorporation processes. A series of carbon-based catalysts containing differently coordinated nitrogen with/without incorporation of iron or iron compounds is disclosed.

Good ORR activity has been observed from nitrogen/iron-doped carbon catalysts with graphene structure and polyaniline-derived carbon catalysts, but time-consuming polymerization processes and additional leaching steps were necessary to remove inactive materials. Fewer steps with less synthesis times were reported for nitrogen-doped graphene and $Co_3O_4$-coated on graphene, but they still required lengthy and complicated manufacturing processes compared to those of Pt/C based catalysts.

In one embodiment, a one-step process to synthesize iron/nitrogen-coordinated CNT catalysts is described. The precious metal free catalysts disclosed herein show high ORR activity and long-term stability comparable to those of Pt based commercial catalysts. Furthermore, a series of experimental analyses have unveiled the reason behind the high ORR performance. A series of synthesis and characterization experiments with/without iron and nitrogen in CNT has identified that the coordination of nitrogen and iron in CNT played a key role in achieving improved catalytic performances. The one-step process disclosed herein could be used for mass production of precious metal free electrocatalysts for a wide range of electrochemical cells including fuel cells and metal-air batteries.

FIG. 1 depicts a composition of matter 100. A nitrogen-doped CNT 102 also contains a transition metal 104. The transition metal 104 might be coordinated with at least one nitrogen atom that comprises the nitrogen doped CNT 102. In one embodiment, the transition metal 104 is iron.

FIG. 2 depicts a structure 200. The structure 200 comprises a plurality of the nitrogen-doped CNT 102 from FIG. 1. The structure 200 is a porous, three-dimensional structure comprised of multiple nitrogen-doped CNTs 102. FIG. 2 shows that the structure 200 is an amalgam of multiple nitrogen-doped CNTs 102 associated with a transition metal 104 that are randomly allocated to give the structure 200 a sponge-like structure. The structure 200 may be referred to as a CNT sponge. The structure 200 is capable of catalyzing an ORR. The structure 200 is also capable of serving as a gas diffusion membrane. Therefore, the structure 200 can be used as an electrode of an electrochemical cell. In particular, the disclosed structure 200 can be used as a cathode of an electrochemical cell. Embodiments of the disclosed structure 200 are stable in acidic and basic environments as discussed in more detail below.

Referring now to FIG. 3, a process 300 for making the composition of matter 100 and structure 200 is shown. In some embodiments, the process 300 may be accomplished via step 302, in which graphitic carbon is grown in an environment comprised of any transition metal and compound containing a transition metal and any nitrogen bearing compound. In some embodiments, and as discussed in more detail in the experimental section, CVD is used to grow CNTs in the presence of ferrocene, aniline, and pyridine to produce the Fe-CNT doped with nitrogen. Other methods known in the art can be used grow the CNTs in the presence of transition-metal containing compounds in the presence of nitrogen-containing compounds.

Referring now to FIG. 4, a process 400 for making the composition of matter 100 and structure 200 is shown. In some embodiments, the process 400 begins with a step 402, in which graphitic carbon is grown in presence of transition metal or transition metal containing compound to form an intermediary structure. At 404, the intermediary structure is doped with nitrogen to form the structure 200. In some embodiments, the graphitic carbon can be grown via CVD in the presence of ferrocene to produce the intermediary structure. The intermediary structure can be doped with nitrogen, using multiple nitrogen sources such as pyridine and polyaniline, for example. Other methods known in the art can be used to grow the CNTs.

Experimental Results

Embodiments of the disclosed composition of matter, structure, and methods were experimentally produced. In addition to generating images of embodiments of the disclosed composition of matter and structure through scanning electron microscopy (SEM), transmission electron microscopy (TEM), x-ray diffraction spectroscopy (XRD), and other spectroscopic techniques, electrochemical measurements of the disclosed structure were generated. The electrochemical measurements demonstrated the behavior of various embodiments of the structure 200 in acidic and basic environments while acting as a catalyst for ORR.

Synthesis Using an Embodiment of the One Step Process

Multi-wall carbon nanotubes were grown on a quartz plate by CVD. Briefly, ferrocene powder was dissolved in aniline, pyridine, and a mixture of aniline and pyridine with a concentration of 60 mg/mL. These solutions were continuously injected into a quartz tube at CVD furnace. The feeding rate was 0.1 mL/min using a syringe pump. The reaction temperature was 950° C. and carrier gas of Ar (99.999%) and $H_2$ (99.999%) was flowing at a rate of 900 sccm and 250 sccm (standard cubic centimeters per minute), respectively. In one embodiment, the temperature of a tube furnace was ramped up to 950° C. in ten minutes with 900 sccm dry Ar. After reaching the reaction temperature, 900 sccm Ar and 250 sccm $H_2$ were added to grow carbon nanotubes at 950° C. for 20 minutes. After the reaction, the Ar flow rate was decreased to 100 sccm while the hydrogen flow was turned off. The products were gathered after the quartz tube had cooled to ambient temperature.

Synthesis

Fe-CNT samples were synthesized by a CVD process in a three-zone furnace. An alumina crucible filled with ~0.3-g ferrocene (Sigma-Aldrich, 98%) was placed in zone 1 (upstream) of a quartz tube whose inner diameter was ~22 mm. During growth, hydrogen (Airgas, 99.999%), ethylene (Airgas, 99.999%), and argon (Airgas, 99.999%) gases were flowed into the quartz tube at flow rates of 260 sccm, 80 sccm, and 80 sccm, respectively. The argon gas was passed through a bubbler filled with deionized (DI) water at room temperature. The furnace comprising three zones was set to have temperatures at zone 1, zone 2, and zone 3 (CNT growth zone) of 120° C., 120° C., and 650° C., respectively. The typical growth time was 30 minutes to obtain a 100-mm long sponge shown in FIG. 5A. After the CVD reaction, the furnace was naturally cooled under 200-sccm argon flow. CNT samples were prepared by immersing Fe-CNT sample in 0.5M $H_2SO_4$ for 24 hours at room temperature, and then washed with DI water, followed by vacuum drying at a pressure of 120 mTorr and a temperature of 80° C. Fe-CNT-ox samples were prepared by annealing Fe-CNT under air at 400° C. for 5 hours.

To obtain Fe-CNT-PA samples, as-synthesized Fe-CNT samples were first treated with a mixture of $H_2SO_4$ and $HNO_3$ for 5 hours and then rinsed with DI water, followed by natural air drying at room temperature. Next, 0.02-g Fe-CNT samples were immersed in a solution containing 5-mL 0.5M HCl (Macro Fine Chemicals) and 0.1-mL aniline (Alfar Aesar, 99+%), and the solution was sonicated for 30 minutes. For polymerization of aniline, ammonium peroxydisulfate (0.31 g) and iron chloride (0.0148 g) were added to the solution, and left at temperatures below 5° C. for 24 hours. The samples were dried under vacuum at a pressure of 120 mTorr and a temperature of 80° C. The samples were then heat-treated under 200-sccm argon flow at 900° C. for 4 hours. To obtain CNT-PA samples, the same nitrogen doping processes for Fe-CNT-PA was carried out except for the polymerization process where iron chloride was not added. For Fe-CNT-Py samples, right after growing Fe-CNT samples, the furnace temperature was increased to 800° C. Then pyridine (Alfa Aesar, 99+%) was introduced to the furnace tube by a syringe pump (Model KDS-100, KD Scientific) at a feeding rate of 20 mL/h under 2000-sccm argon and 100-sccm hydrogen for 30 minutes.

To obtain Py/Fe-CNT, nitrogen doping was achieved at the same time as the growth of CNT by CVD method with a one-zone furnace. Ferrocene (0.9 g) was first dissolved in a mixture of thiophene (150 1-1 L) and pyridine (30 mL) to make a precursor solution. The solution was injected into a 1-inch quartz tube by a syringe pump at a feeding rate of 0.8 mL/min under the flow of argon (900 sccm) and hydrogen (100 sccm). The growth temperature was 950° C. and the growth time was 30 minutes.

Images of Embodiments of Synthesized Structure

Figure 5B:
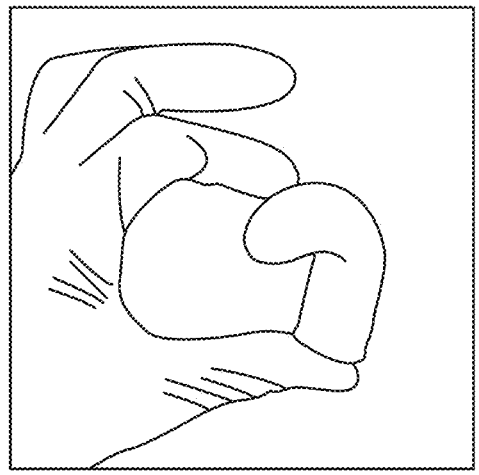
FIG. 5B is a photograph of the cylindrical sponge-like CNT structure of FIG. 5A withstanding a large deformation without fracturing.
Figure 5C:
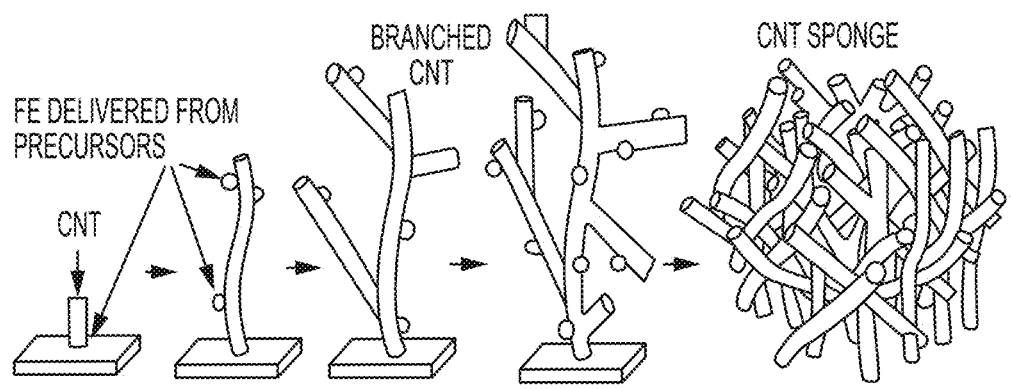
FIG. 5C demonstrates an evolution of a proposed synthesis process of a porous CNT structure.

Experimentally produced samples include sponge-like porous structures with randomly oriented and entangled CNTs. As shown in FIG. 5A and FIG. 5B, the sponge replicated the cylinder shape of the quartz tube whose inner diameter is ~22 mm. A length of the sponge is determined by the reaction time. The experiment resulted in 100 mm long cylindrical sponges, which can be much longer with additional apparatus for bulk manufacturing in the future. The sponge-like morphology was obtained by making CNT branches from the stem of other CNTs as iron catalysts for growing CNTs were continuously delivered during the synthesis process. At the beginning, ferrocene was decomposed at temperatures above 400° C. forming iron nanoparticles on the wall of a quartz tube, which serve as catalysts for growing CNTs with carbon and/or nitrogen containing precursors. As ferrocene was continuously delivered to the reaction zone, additional iron nanoparticles were attached to the wall of existing CNTs during the synthesis process. Meanwhile, carbon and/or nitrogen containing precursors were continuously conveyed to the reaction zone, promoting the growth of new CNTs from the iron nanoparticles on the wall of existing CNTs, and ultimately forming 3D sponge-like porous structures. FIG. 5C is an illustration demonstrating a proposed synthesis process.

Chemical Characterization of an Embodiment of the Disclosed Structure

Figure 9A:
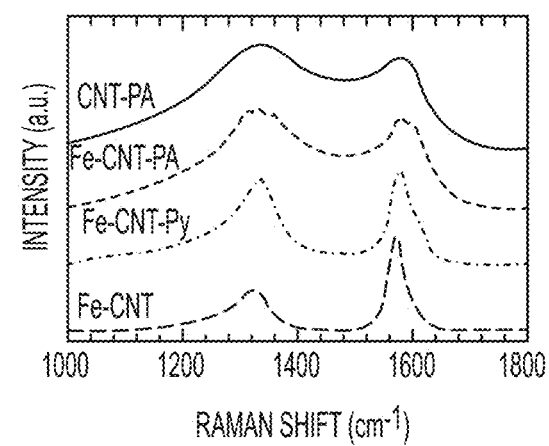
FIG. 9A is a graph showing Raman spectra of Fe-CNT, Fe-CNT-Py, Fe-CNT-PA, and CNT-PA.
Figure 9B:
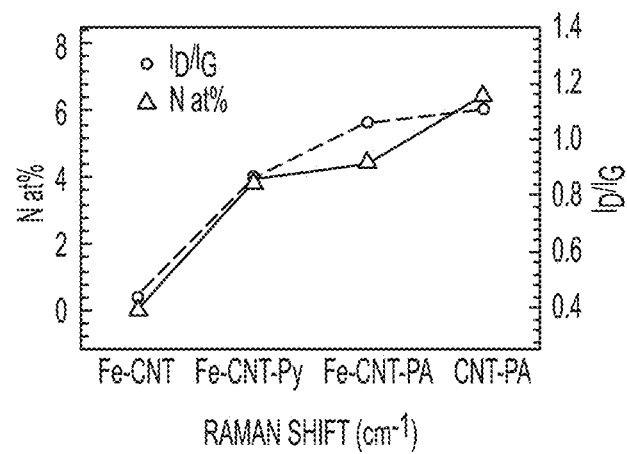
FIG. 9B is a graph showing nitrogen at % and $I_D/I_G$ of Fe-CNT, Fe-CNT-Py, Fe-CNT-PA and CNT-PA.

X-ray diffraction (XRD) indicates that Fe-CNT contains Fe, $Fe_{15.1}C$ (austenite), and $Fe_3C$ (iron carbide). The main carbon peak at $2\theta=26.2°$ in XRD corresponds to the (0 0 2) layers of the concentric graphitic multi-walls, from which an interlayer distance of 0.34 nm (same as obtained from TEM) can be calculated based on Bragg's law. The Fe and $Fe_3C$ peaks were suppressed after an acid treatment. $\alpha$-$Fe_2O_3$ peaks appeared after the annealing of Fe-CNT in air (oxidation). It appears that the heat treatment process turned the iron and iron compounds into $\gamma$-$Fe_2O_3$ despite the environment with a low concentration of oxygen (99.999% Ar). The relatively small intensity of the peaks from Fe-CNT-PA can be attributed to the amorphous polyaniline coating layer around CNTs. The post doping process with pyridine in Fe-CNT-Py resulted in the intensity increase of $Fe_{15.1}C$ and $Fe_3C$, which can be ascribed to the introduction of additional carbon source from pyridine. A peak broadening and shift (towards lower angles), corresponding to the graphitic carbon (0 0 2) layer for Py/Fe-CNT, can be seen, which suggests that the variation of the interlayer distances whose average is larger than those of other CNTs. In-situ nitrogen doping process facilitated nitrogen incorporation into the graphitic carbon layer, which cannot afford the planar structure like $sp^2$ hybridized carbon due to $sp^3$ hybridization of graphitic nitrogen. According to X-ray photoelectron spectroscopy (XPS) results, the concentration of nitrogen in Py/Fe-CNT was found to be 7.3 at % (highest among all samples), which is high enough to cause buckling of the graphitic carbon layers. The nitrogen-doping effect was also studied by Raman spectroscopy as shown in FIG. 9A. A correlation between the $I_D/I_G$ and N at % is shown in FIG. 9B.

The effect of nitrogen doping was also studied by Raman spectroscopy The two peaks at ~1330 $cm^{-1}$ and ~1580 $cm^{-1}$ can be assigned to D-band and G-band, respectively. The G-band presents graphitic structure while the D-band indicates defects due to disordered graphitic carbon. The intensity ratios of D-band to G-band ($I_D/I_G$) can be considered as one of the key parameters to indicate the defect level in CNTs. By comparing the $I_D/I_G$ and the nitrogen at %, we found that $I_D/I_G$ was increased with nitrogen at % presumably due to disorder or defects in the graphitic carbon structure with the nitrogen substitution. In addition, broader D-band and G-band peaks were observed with higher nitrogen at %, which may suggest the disorder in the basal plane of graphitic carbon layers. The shift of the G-bands of the nitrogen-doped samples towards higher frequencies compared to Fe-CNT could be explained by the stronger C—N bonding compared with C—C bonding.

ORR Catalytic Activity of Embodiment of Disclosed Structure

Embodiments of the synthesized, disclosed structures also were tested for their ability to catalyze the ORR. Their catalytic activities for ORR were tested by using both rotating disk electrode (RDE) and cyclic voltammetry (CV) measurements in both 0.5M $H_2SO_4$ and 0.1M KOH, and the performance of Fe-CNT-PA was found to be the best in both acidic and alkaline environments. The rotating speed and scan rate is 1600 rpm and 5 m V $s^{-1}$. The loadings of catalysts for all measurements are 0.5 mg $cm^{-2}$, except that for Fe-CNT-PA 2D and Fe-CNT-PA 3D the loading is 4.25 mg $cm^{-2}$. The rotating speed and scan rate of all curves is 1600 rpm and 5 $mVs^{-1}$, respectively. The loadings of catalysts for all measurements are 0.5 mg $cm^{-2}$, except that for Fe-CNT-PA 2D and Fe-CNT-PA 3D the loading is 4.2 mg $cm^{-2}$.

According to the RDE measurement, a half-wave potential difference between Fe-CNT-PA and Pt/C (100 $\mu g_{pt}/cm^2$) in 0.5M $H_2SO_4$ is only ~67 mV, which is comparable or better than those of other non-Pt based catalysts. The limiting current density of Fe-CNT-PA, which is completely under mass-transport control, was larger than that of Pt/C, suggesting more electrochemically active sites in Fe-CNT-PA than that of Pt/C. This is partly due to larger surface area and higher porosity of Fe-CNT-PA than Pt/C, which can be seen under SEM for as-prepared electrodes.

The large peak current density for Fe-CNT-PA under oxygen environment in the CV results also suggests a large number of active sites while the larger capacitive current indicates greater surface areas and enhanced $O_2$ transport within the catalyst layer than those of Pt/C. When nitrogen was purged to deplete oxygen before and during CV test, a pair of redox peaks at 0.40 V and 0.45 V were observed, which are attributed to the redox reaction between Fe(II) and Fe(III).

In order to clarify the effect of the 3D feature from the CNT sponge, CV was carried out with two differently prepared Fe-CNT-PA samples. For the first testing electrode (Fe-CNT-PA 3D), the as-synthesized Fe-CNT-PA was carefully cut and then directly attached to the glassy carbon electrode with carbon paint in order to preserve the porous 3D feature. For the second testing electrode (Fe-CNT-PA 2D), the Fe-CNT-PA ink used in the previous test was dropped several times in order to have the same catalyst loading weight on glassy carbon as the first one. The 3D sample displayed markedly larger capacitive and kinetic current compared to the 2D sample, which suggests greatly enlarged active surface areas and enhanced mass transport for ORR through the pores in the 3D structure.

In 0.1M KOH, the limiting current density and half-wave potential in the RDE results for Fe-CNT-PA are both higher than those of Pt/C, indicating the high catalytic activity of Fe-CNT-PA in a basic environment. Compared to the acidic environment, the non-Pt based catalysts with nitrogen doping showed relatively good performance. For Fe-CNT-PA, a clear reduction peak appeared on the CV profile of $O_2$ saturated case in comparison to $N_2$ saturated case. It also has a higher peak current density and capacitive current density than Pt/C, which is similar as in the acidic environment. In addition, the Fe-CNT-PA 3D again showed a considerably improved performance compared to Fe-CNT-PA 2D in a basic environment.

The correlation of nitrogen doping and iron with their ORR performance was analyzed. It was shown that nitrogen doping is essential to have good performance when the activities of CNT, Fe-CNT, and Fe-CNT-ox were compared with those of the nitrogen-doped samples. Here the nitrogen doping was differentiated by employing two post doping (polyaniline for Fe-CNT-PA and CNT-PA; pyridine for Fe-CNT-Py) and one in-situ doping (pyridine for Py/Fe-CNT) processes so as to compare the influence of doping concentration and coordination on catalytic activities. According to XPS results, Py/Fe-CNT-s, CNT-PA, and Fe-CNT-Py share identical Pyridinic N to Graphitic N ratio (0.9), meaning a similar nitrogen composition. The only difference is the total nitrogen concentration, which is decreasing from Py/Fe-CNT-s (7.31 at %) to Fe-CNT-Py (3.86 at %).

Meanwhile, the limiting current density in the RDE result follows the same trend as total nitrogen concentration. So if the nitrogen composition is similar, the limiting current density, which is a representative of the amount of active site, relates to the total nitrogen concentration. However, Fe-CNT-PA does not have the highest nitrogen concentration, but shows a significantly better performance in both acidic and basic environments. This can be explained by the differences of nitrogen composition and coordination. Fe-CNT-PA has the highest intensity ratio (1.3) of pyridinic N to graphitic N in comparison to the identical ratio (0.9) from the others. In addition, there is a clear shift of pyridinic N peak of Fe-CNT-PA towards a higher binding energy, which can be attributed to its coordination with iron due to the formation of Fe-NX aggregates during the pyrolysis process. In order to confirm the coordination between pyridinic N and iron, a high resolution Fe 2p scan was performed. As expected, there was a downshift (lower binding energy) of surface Fe(III) $2p_{3/2}$ peak on Fe-CNT-PA compared to Fe-CNT-ox (no nitrogen content), indicating the coordination effect between pyridinic N and iron. Hence, it is likely that the pyridinic N coordinated with iron is the primary ORR active site, while the other nitrogen sites are the secondary ORR active sites. For Fe-CNT-PA, the primary sites were formed during the pyrolysis process, in which Fe-NX was incorporated into graphitic structure. It has been known that during the pyrolysis process not only the Fe-NX incorporation would happen but also the final nitrogen doped graphitic carbon structure would become a relatively n-electron-deficient ligand leading to a lower electron density on the iron center, which would greatly weaken the bond strength between the iron and the ORR intermediates and therefore improve the catalytic activity. Since the primary site is much more active towards ORR than the secondary site, the outstanding performance of Fe-CNT-PA can be understood. In addition, this Fe-NX coordination, same as previous reports, also results in more efficient 4-electron reaction pathway which can be clearly observed from the Koutecky-Levich plots derived from RDE test with different rotating speeds in both acidic (e.g., see FIG. 10D and FIG. 10E) and basic solutions. This high efficient 4-electron mechanism on Fe—$N_x$ site has also been proved by first-principles density functional theory (DFT) calculations recently.

The role of iron has remained controversial in the non-precious metal ORR catalysts. Iron coordinated with pyridinic nitrogen appears to be the primary ORR active site in Fe-CNT-PA, but $Fe_2O_3$ was also found in the XRD result. In order to examine the role of $Fe_2O_3$, the iron compounds in Fe-CNT were converted to $Fe_2O_3$ through an annealing process in air at 400° C. for five hours to obtain Fe-CNT-ox, as confirmed by XRD. Negligible differences in ORR performance were observed, suggesting iron oxide is barely active for ORR. The influence of Fe by itself on ORR was also found to be trivial by comparing the ORR performance of CNT and Fe-CNT. Instead, it appears that iron was helpful in forming more pyridinic nitrogen by comparing the pyridinic nitrogen to graphitic nitrogen ratio of CNT-PA and Fe-CNT-PA. High pyridinic nitrogen concentration is essential to the formation of the primary ORR active site. Nevertheless, the form of iron in the nitrogen incorporation process determines the final ratio of primary ORR active site. The iron source in Py/Fe-CNT-s was ferrocene, which decomposed at the reaction zone to become the catalyst for CNT growth. Due to the in-situ nitrogen doping process, iron was in the form of Fe during the doping process and remained as Fe and $Fe_3C$ in the final product. The iron source in Fe-CNT-Py was the original iron in Fe-CNT, which became Fe and $Fe_3C$ after the doping process. In the case of Fe-CNT-PA, additional iron source, $FeCl_3$, was added during the nitrogen doping process, followed by pyrolysis, which resulted in additional Fe(III) $2p_{3/2}$ peak in the XPS. As discussed previously, the pyridinic nitrogen in Fe-CNT-PA is partially coordinated with iron. The additional Fe(III) peak in Fe-CNT-PA strongly suggests that the coordination happens between pyridinic nitrogen and surface Fe(III), which forms a speculated primary active site. Although Fe-CNT-PA has the highest final Fe at %, the concentration of Fe, $Fe_{15.1}C$ (austenite), and $Fe_3C$ (iron carbide) was low, compared to Py/Fe-CNT-s and Fe-CNT-Py according to the peak intensity in XRD. This clearly indicates that most of the iron in Fe-CNT-PA was converted to forming the primary ORR active site, while in Py/Fe-CNT-s and Fe-CNT-Py it was crystalized into $Fe_3C$ and $Fe_{15.1}C$.

The long-term stabilities of Fe-CNT-PA along with Pt/C for comparison were tested in both 0.5M $H_2SO_4$ and 0.1M KOH. The degradation of Pt/C is mainly coming from the dissolution of Pt nanoparticles, which is more severe at high electrode potentials. Nevertheless, Fe-CNT-PA showed a better stability than commercial Pt/C in both acidic and alkaline environments. The half-wave potential of Fe-CNT-PA drops 0.13 V, compared with 0.21 V for Pt/C, after 20,000 cycles in $O_2$-saturated 0.5M $H_2SO_4$; while, it decreased by 0.13 V, compared with 0.11 V for Pt/C after 30,000 cycles in $O_2$-saturated 0.1M KOH. The strikingly high stability in the very harsh environment (0.5M $H_2SO_4$) is of great value in non-noble metal-based catalysts which usually suffer poor performance especially in highly acidic environment like 0.5M $H_2SO_4$. Compared with recently reported nonprecious metal-based catalysts, the Fe-CNT-PA also shows a better performance in terms of catalytic activity and long-term stability. For example, in the harsh acidic environment (0.5M $H_2SO_4$), the half-wave potential is 20 mV and 30 mV higher than MWNT-CoP and Fe-ED/PPy-CNF, respectively, and similar with PpPD-Fe—C, indicating a high catalytic activity. The stability of the Fe-CNT-PA in $O_2$ saturated 0.5M $H_2SO_4$ is the best based on 20,000 cycles. Compared with Fe-PANI-C, the limiting current density of the Fe-CNT-PA dropped about 9% after 20,000 cycles, but Fe-PANI-C dropped the same degree after 5,000 cycles. The Fe-CNT-PA was cycled under $O_2$-saturated 0.5M $H_2SO_4$, while Fe-PANI-C was cycled under $N_2$-saturated 0.5M $H_2SO_4$. The higher $O_2$ concentration normally leads to a higher degradation rate of catalysts, which suggests that the disclosed catalyst is much better in maintaining the density of active site even in a harsher environment. This is one of the most important factors for actual PEMFC. In an alkaline environment (0.1M KOH), the Fe-CNT-PA also shows at least comparable, if not better, performance among the reported best nonprecious metal-based catalysts. The half-wave potential is 15 mV and 120 mV higher than $Fe_xN/NGA$ and N-Graphene, respectively. In terms of stability, 0.13 V half-wave potential drop and 8% reduction in limiting current density have hardly been seen after 30,000 cycles in $O_2$ saturated 0.1M KOH.

All samples were made into ink to test their electrocatalytic activities, except for Fe-CNT-PA 3D. To make homogeneous ink, 7 mg sample and 160 µL of 5 wt % Nafion solution (Fuel Cell Earth) were dispersed in a mixture of $H_2O$ (670 µL) and ethanol (170 µL) by sonication for 1 h. CV and RDE tests were carried out using an electrochemical workstation (CHI 604D, CH Instrument) in a three-electrode system with an Ag/AgCl electrode as reference electrode, and a platinum wire as counter electrode at room temperature. The working electrode was prepared by loading 5 µL of catalyst ink onto the glassy carbon electrode (3 mm-diameter), resulting in 0.5 mg $cm^{-2}$ catalyst loading. For comparison, commercial 20 wt % Pt/C (Fuel Cell Earth) was used and its ink was prepared by the same recipe, resulting in 100 $g_{Pt}cm^{-2}$ loading. In order to confirm the improvement resulted from 3D porous structure, a small round flat piece (3 mm-diameter) of Fe-CNT-PA (0.3 mg) was carefully cut in order to match the area of glassy carbon electrode and attached on the glassy carbon electrode by using carbon paint, which was denoted as Fe-CNT-PA 3D. Fe-CNT-PA 2D was prepared by repeating dropping (5 uL Fe-CNT-PA ink) and drying 8 times followed by another 2.4 uL. Therefore the final loading of Fe-CNT-PA 3D and Fe-CNT-PA 2D was the same (4.2 mg $cm^{-2}$).

For $O_2$ (or $N_2$) saturated measurement, the electrolyte 0.5 M $H_2SO_4$ or 0.1 M KOH was purged with $O_2$ (or $N_2$) for more than 15 minutes (or 30 minutes) before the test and a flow of $O_2$ (or $N_2$) was continuously fed into the system to maintain $O_2$ (or $N_2$) saturation during the electrochemical tests. The scan rates used for all CV and RDE tests were 0.1 V $s^{-1}$ and 5 mV $s^{-1}$ respectively. Koutecky-Levich plots were prepared based on the Koutecky-Levich equation:

$$\frac{1}{J} = \frac{1}{J_K} + \frac{1}{J_L} = \frac{1}{J_K} + \frac{1}{B\omega^{1/2}}$$
$$B = 0.62 \cdot n \cdot F \cdot C \cdot D^{2/3} \cdot v^{-1/6}$$

where ω is the rotation rate, n is the number of electron transferred, F is the Faraday constant (F=96485 C $mol^{-1}$) C is the bulk concentration of $O_2$ (C=1.2×$10^{-6}$ mol $cm^{-3}$ for 0.1M KOH, and C=1.1×$10^{-6}$ mol $cm^{-3}$ for 0.5M $H_2SO_4$), D is the diffusion coefficient of $O_2$ in 0.1M KOH electrolyte (D=1.9×$10^{-5}$ $cm^2$ $s^{-1}$ for 0.1M KOH, and D=1.8×$10^{-5}$ $cm^2$ $s^{-1}$ for 0.5M $H_2SO_4$), and v is kinematic viscosity of electrolyte (v=0.01 $cm^2$ $s^{-1}$ for both 0.1M KOH and 0.5M $H_2SO_4$).

Characterization

X-ray diffraction (XRD) measurements were performed using a Bruker instrument (Bruker-AXS D8 VARIO) with Cu Kα radiation. The patterns were measured from 2θ=15 to 750 with a step size of 0.01° and dwell time of 0.1 s. SEM images were collected on JEOL JSM-7500F and TEM images were obtained with JEOL JEM-2010 TEM and FEI TECNAI G2 F20 FE-TEM. Raman spectra were recorded using a Raman confocal microscope (Horiba Jobin-Yvon LabRam) with 632.8 nm excitation wavelength. All spectra were acquired at room temperature and with a maximum laser power of 4.0 mW in order to avoid sample heating. Thermogravimetric analysis (TGA) was performed on Q600-TGA analyzer (TA Instruments). For all TGA experiments, samples (typically ~10 mg) in an alumina pan were heated in air (100 mL $min^{-1}$) from room temperature to 800° C. at a rate of 10° C. $min^{-1}$. XPS spectra were studied by Kratos Axis Ultra DLD XPS. Survey scans were collected with 1.0 eV resolution followed by high resolution scanning of Fe 2p, C 1s, N 1s, O 1s, and S 2p.

Results and Discussions

The base material of samples has sponge-like porous structures with randomly oriented and entangled CNTs. As shown in FIG. 5A, the sponge replicated the cylinder shape of the quartz tube whose inner diameter is ~22 mm. The sponge length was controlled by reaction time, and ~30 min reaction yielded ~100 mm long cylindrical sponge. The as-formed CNT sponge is deformable to a large extent without any fracture (e.g., see FIG. 5B), which can be attributed to the unique framework made of loosely packed and entangled CNTs. In comparison to previously reported methods of synthesizing bulk CNT structures, the disclosed process features a remarkably improved production rate (~3.6 g/h or 76 $cm^3$/h compared with ~0.018 g/h or 9.6 $cm^3$/h in literature), considerably reduced material costs (~$0.1/gCNT compared with ~$85.2/gCNT in literature), and simplified processes that do not require precursor solutions and liquid feeding systems.

Figure 5D:
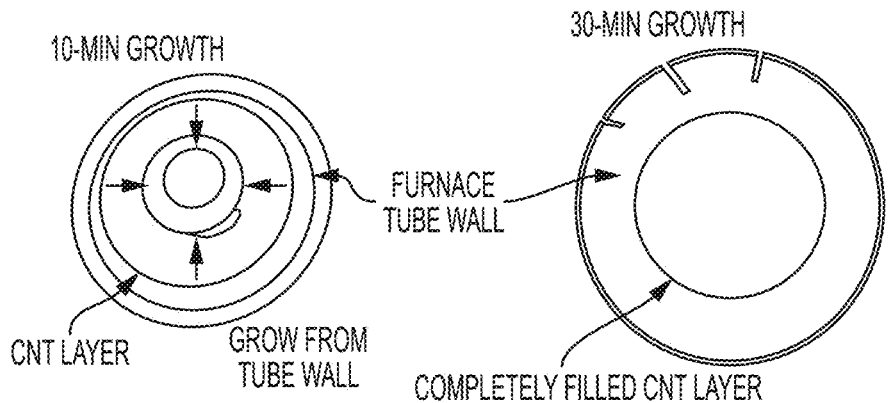
FIG. 5D includes two photographs showing a growth reaction of an inside of a furnace tube after 10 minutes and a 30 minutes, respectively.

The suggested growth reaction is illustrated in FIG. 5C. At the beginning, ferrocene was decomposed at temperatures above 400° C. forming iron nanoparticles on the wall of a quartz tube, which serve as catalysts for growing CNTs with carbon-containing ethylene gas. As ferrocene continuously delivered to the reaction zone, additional iron nanoparticles were attached to the wall of existing CNTs during the synthesis process. Meanwhile, ethylene gas was continuously conveyed to the reaction zone, promoting the growth of new CNTs from the iron nanoparticles on the wall of the existing CNTs, and ultimately forming 3D sponge-like porous structures. The inside of a furnace tube after 10- and 30-min growth reactions (FIG. 5D) indicates that the growth occurs in the radial direction toward the center of the tube, supporting the suggested growth process.

Figure 13:
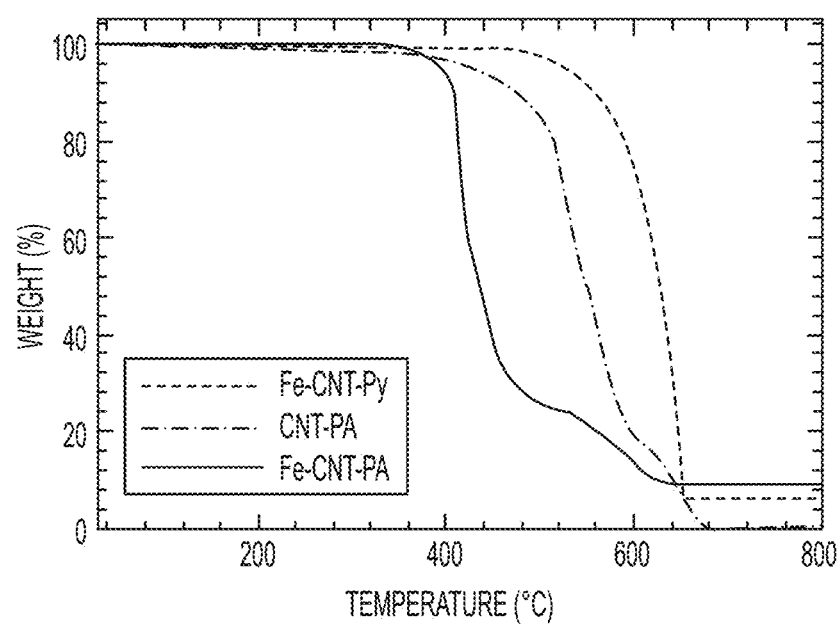
FIG. 13 is a graph of TGA results of Fe-CNT-Py, CNT-PA, and Fe-CNT-PA.
Figure 16:
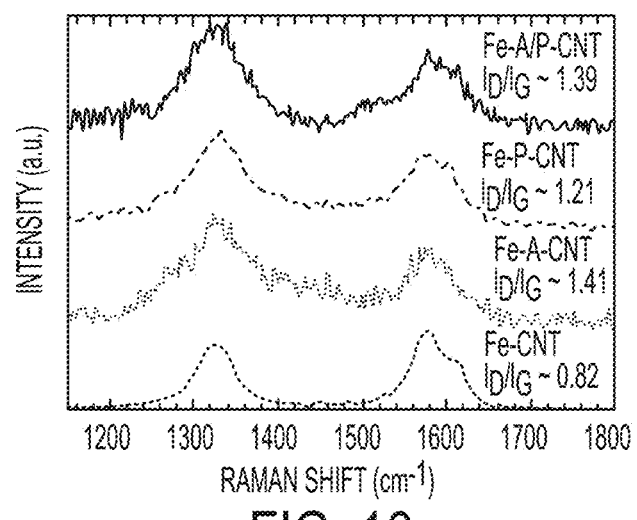
FIG. 16 is a graph showing Raman spectra of the iron-incorporated CNTs and the intensity ratio of D-band to G-band ($I_D/I_G$)

The synthesis process of the as-synthesized sponge was varied to have a series of different samples so as to study the roles of iron and its compounds as well as the influence of the chemical environment of nitrogen on ORR. To find the role of iron for ORR, the as-synthesized sponge (labelled as "Fe-CNT") was washed with sulfuric acid to have iron deficient CNTs, which are labelled as "CNT". In order to investigate the role of iron in forming different nitrogen doping states, CNT sponges with iron and polyaniline (labelled as "Fe-CNT-PA") and CNT sponges with only polyaniline (labelled as "CNT-PA") were prepared by selectively adding iron source ($FeCl_3$) to CNT for Fe-CNT-PA during the nitrogen incorporation process. The iron contents in Fe-CNT-PA and CNT-PA were found to be 1.5 and 0.1 at % according to thermogravimetric analysis (TGA) (see FIG. 13). Fe-CNT was also annealed in air (labelled as "Fe-CNT-ox") to convert iron and iron compounds to iron oxides so as to investigate the effect of iron oxides on ORR. The influence of pyridinic/graphitic nitrogen as well as nitrogen concentration on ORR was also studied by using pyridine instead of polyaniline as a nitrogen source (labelled as "Fe-CNT-Py").

Figure 6:
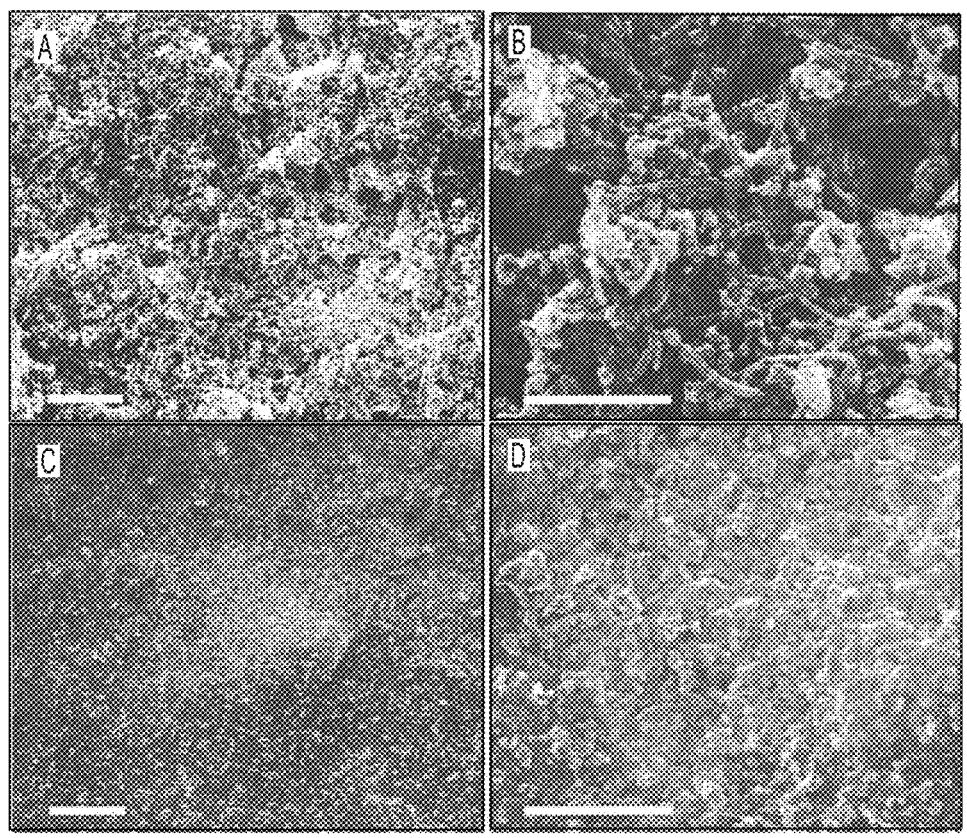
FIG. 6 shows SEM images of a catalyst ink made of Fe-CNT-PA (A and B) and SEM images of a catalyst ink made of Pt/C (C and D)
Figure 7:
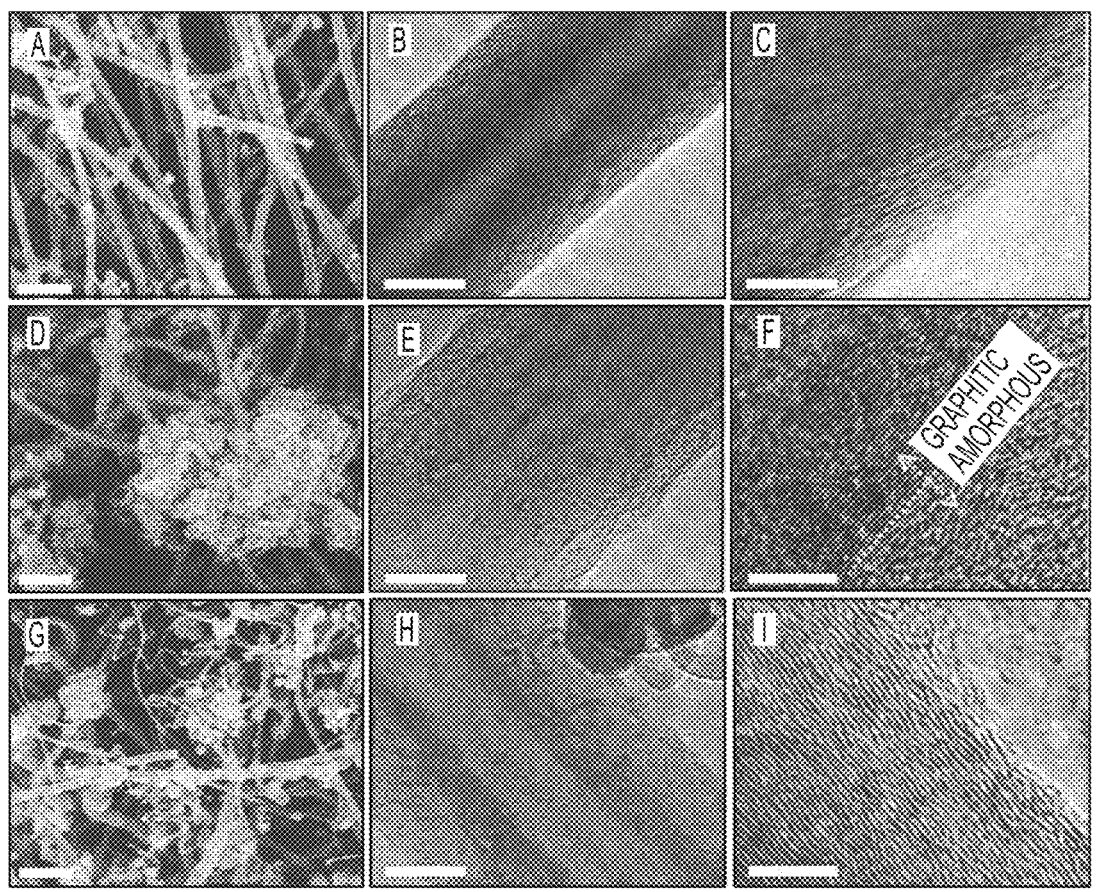
FIG. 7 shows SEM and TEM images of CNT sponges; Fe-CNT (A, B and C); Fe-CNT-PA (D, E and F); and Fe-CNT-Py (G, H and I)
Figure 11:
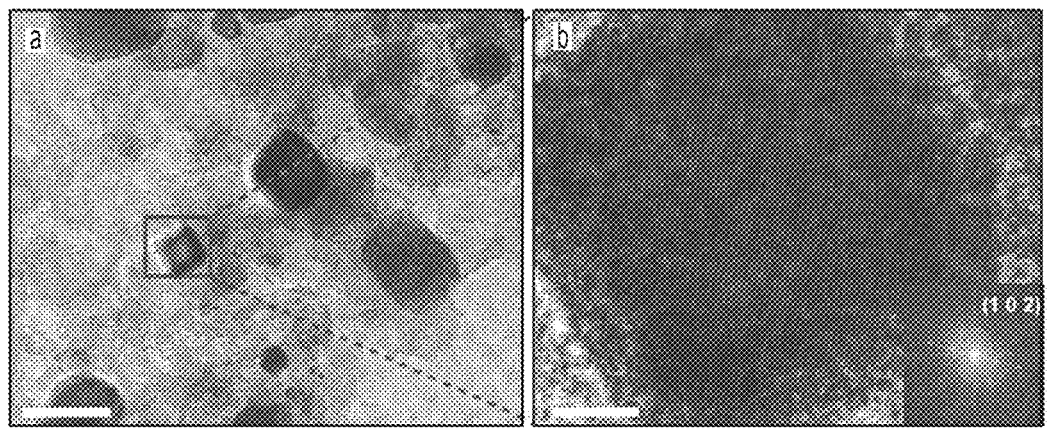
FIG. 11 shows high resolution TEM images of an aggregated portion in Fe-CNT-PA.

A scanning electron microscope (SEM) image of Fe-CNT is shown in FIG. 14A, which displays porous CNT structures with nanoparticles attached to the stem of the CNTs. Transmission electron microscope (TEM) images of Fe-CNT indicate that the CNT walls are composed of multiple graphitic layers (e.g., see FIG. 7B and FIG. 7C). The polyaniline coating for nitrogen doping (Fe-CNT-PA) created aggregates (e.g., see FIG. 7D) and amorphous layer on the surface of CNT walls (e.g., see FIG. 7E and FIG. 7F). The graphitic and continuous inner walls were preserved after the polymerization process of polyaniline, suggesting the presence of highly electrically conducting paths. The aggregates consisted of amorphous layers with nanoparticles (e.g., see FIG. 11A) whose interlayer distance was calculated to be 0.67 nm corresponding to $\gamma$-$Fe_2O_3$(1 0 2) (JCPDS 25-1402, 0.694 nm) (FIG. 11B). On the other hand, post doping with pyridine (Fe-CNT-Py) resulted in mainly graphitic CNT surface (e.g., see FIG. 6G, FIG. 6H and FIG. 6I).

FIG. 15A shows X-ray diffraction (XRD) results for Fe-CNT indicating that Fe-CNT is likely to contain $Fe_3C$ (four peaks between $2\theta=43°$ and $46°$), $Fe_{15.1}C$ (austenite), and Fe. The main carbon peak at $2\theta=26.2°$ in XRD corresponds to the (0 0 2) layers of the concentric graphitic multi-walls, from which an interlayer distance can be calculated to be 0.34 nm (same as that from TEM) based on Bragg's law. The XRD peaks corresponding to $Fe_3C$, $Fe_{15.1}C$, and Fe were suppressed after the acid treatment (e.g., see FIG. 15B). $\gamma$-$Fe_2O_3$ peaks (JCPDS 33-0664) appeared after the annealing of Fe-CNT in air (oxidation) (e.g., see FIG. 15C). For Fe-CNT-PA, it appears that the heat treatment process, even under the environment with a low concentration of oxygen (99.999% Ar), turned the iron and iron compounds into $\gamma$-$Fe_2O_3$ (e.g., see FIG. 8D). The relatively small peak intensity from Fe-CNT-PA could be partly attributed to the amorphous polyaniline coating layer around CNTs. The post doping process with pyridine in Fe-CNT-Py resulted in the intensity increase of iron-carbon compounds (e.g., see FIG. 8E), which may be ascribed to the introduction of additional carbon source from pyridine at high temperature (800° C.) resulting a higher crystallinity compared to Fe-CNT-PA. The nitrogen doping may have caused the higher intensity ratios of D-mode to G-mode ($I_D/I_G$) in the Raman spectroscopy, which indicates the defects or disorder in CNTs, as shown in FIG. 9.

When the limiting current density is observed, which is closely related to the number of active sites for ORR, the highest was Fe-CNT-PA and CNT-PA was slightly better than Fe-CNT-Py. However, according to the XPS results, the total nitrogen at % of Fe-CNT-PA was the lowest while CNT-PA had the highest total and pyridinic nitrogen at % and Fe-CNT-Py had the lowest total and pyridinic nitrogen at %'s. Note that the performance comparison was done for the basic environment since 0.5M $H_2SO_4$ is a very harsh environment that quickly degraded the samples "except" Fe-CNT-PA. Considering the performance of only CNT-PA and Fe-CNT-Py, this trend indicates that total or pyridinic nitrogen is important for ORR, but the high performance of Fe-CNT-PA despite the low nitrogen at % cannot be explained, suggesting ORR is not solely dependent on the nitrogen concentrations.

Therefore further investigation of nitrogen coordination with iron was performed since it has been claimed to be important in properly designing macrocycles with transition metals and nitrogen for ORR. The initial ORR performance of macrocycles was found to be excellent but poor stability and complexity in synthesis made them impractical. For Fe-CNT-PA, a clear shift of the pyridinic N 1s peak towards a higher binding energy was observed, which can be attributed to its coordination with iron due to the formation of Fe—$N_x$ aggregates during the pyrolysis process. The coordination between pyridinic N and iron was also confirmed by the downshift (lower binding energy that indicates the coordination effect) of $Fe^{3+}$ $2p_{3/2}$ peak for Fe-CNT-PA compared to Fe-CNT-ox (no nitrogen content) from the high resolution Fe 2p scan. Here the Fe $2p_{3/2}$ peaks of Fe-CNT-PA and Fe-CNT-ox can be fitted with two peaks, corresponding to the $Fe^{3+}$ in the bulk and $Fe^{3+}$ at the surface. The higher binding energy (~715 eV) may originate from the surface mainly due to the deficiency of oxygen coordination at the surface. According to XRD (e.g., see FIG. 8) and HRTEM (e.g., see FIG. 25) results, Fe-CNT-PA and Fe-CNT-ox respectively have $\gamma$-$Fe_2O_3$ and $\alpha$-$Fe_2O_3$. For $\gamma$-$Fe_2O_3$, ⅜ of the $Fe^{3+}$ cations are in the tetrahedral sites and the rest are in the octahedral sites, while, for $\alpha$-$Fe_2O_3$, all $Fe^{3+}$ cations are in the octahedral sites. However, according to the previous report, there is no clear difference in the Fe $2p_{3/2}$ peaks of $\gamma$-$Fe_2O_3$ and $\alpha$-$Fe_2O_3$.

In addition, Fe-CNT-PA has the highest iron at % (1.48%) from TGA (e.g., FIG. 13), but the peak intensity of Fe, $Fe_{15}$. C, and $Fe_3C$ were the lowest according to the XRD result (e.g., see FIG. 8), suggesting that many of the iron in Fe-CNT-PA may be coordinated with nitrogen to form the primary ORR active site rather than crystalized into the iron compounds. Therefore, it is speculated that the pyridinic N coordinated with iron is the primary ORR active site that provides the high ORR activity, while the other nitrogen sites are the secondary ORR active sites. For Fe-CNT-Py, the peak at ~707.2 eV matches $Fe_3C$ in literature, while the other peak (~711 eV) could be the oxidation of $Fe_3C$ on the surface, resulting in $Fe^{3+}$ characteristics.

Figure 8:
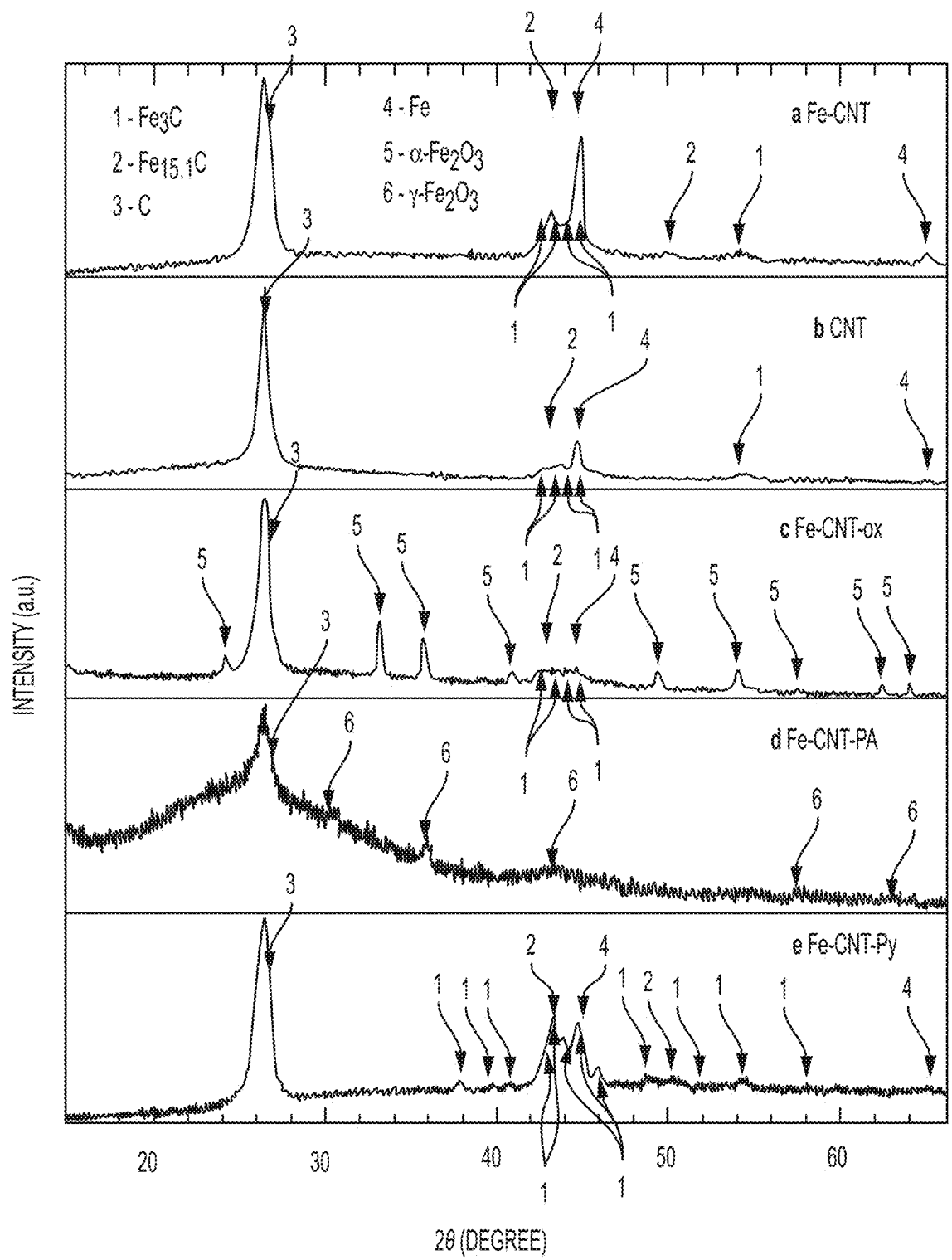
FIG. 8 shows XRD results including peak locations of $Fe_3C$, $Fe_{15.1}C$, graphitic C, Fe, $\alpha\text{-}Fe_2O_3$, and $\gamma\text{-}Fe_2O$; a=Fe-CNT; b=CNT; c=Fe-CNT-ox; d=Fe-CNT-PA; e=Fe-CNT-Py.
Figure 12A:
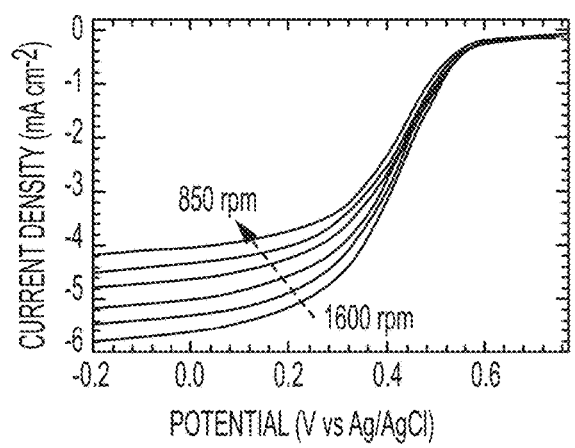
FIG. 12A and FIG. 12B are graphs showing RDE test results at 1600 rpm and lower rotating speeds with Fe-CNT-PA in $O_2$-saturated 0.5M $H_2SO_4$ and 0.1M KOH, respectively.
Figure 12B:
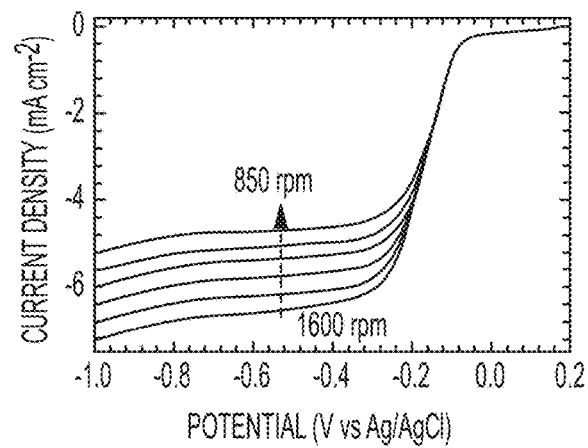

In order to examine the role of $Fe_2O_3$, iron compounds were converted in Fe-CNT to $Fe_2O_3$ by annealing in air at 400° C. for 5 hours to obtain Fe-CNT-ox, as confirmed by XRD (FIG. 8). Negligible differences in ORR performance were observed, suggesting iron oxide is barely active for ORR. The influence of Fe by itself on ORR was also found to be trivial by comparing the ORR performance of CNT and Fe-CNT, but the difference in the ratios of the pyridinic N to graphitic N in CNT-PA (0.91) and Fe-CNT-PA (1.30) may suggest that iron is helpful in forming pyridinic nitrogen rather than graphitic nitrogen presumably due to the coordination of nitrogen with iron. The high ORR activities would have resulted in efficient 4-electron reactions for Fe-CNT-PA according to the Koutecky-Levich plots derived from RDE tests with different rotating speeds in both acidic and basic (e.g., see FIG. 10A and FIG. 10B, respectively) solutions (see FIG. 12 for polarization curves as a function of the rotational speed).

Figure 10A:
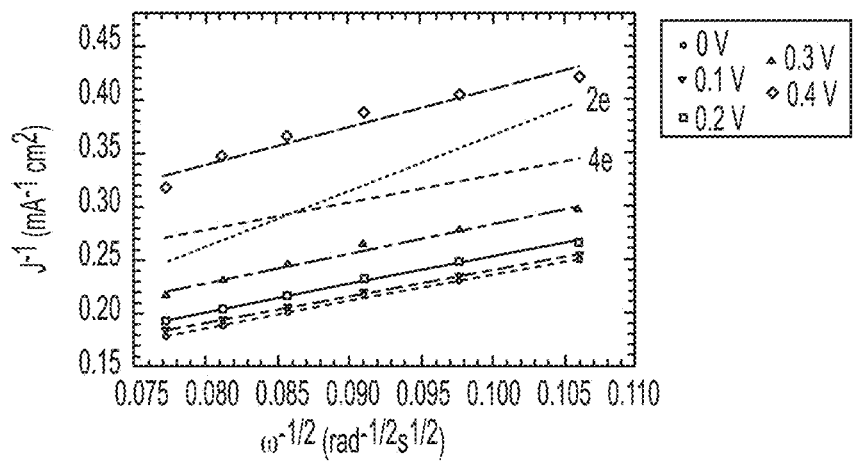
FIG. 10A and FIG. 10B are graphs showing Koutecky-Levich plots of Fe-CNT-PA in $O_2$ saturated 0.5M $H_2SO_4$ and $O_2$-saturated 0.1M KOH, respectively.
Figure 10B:
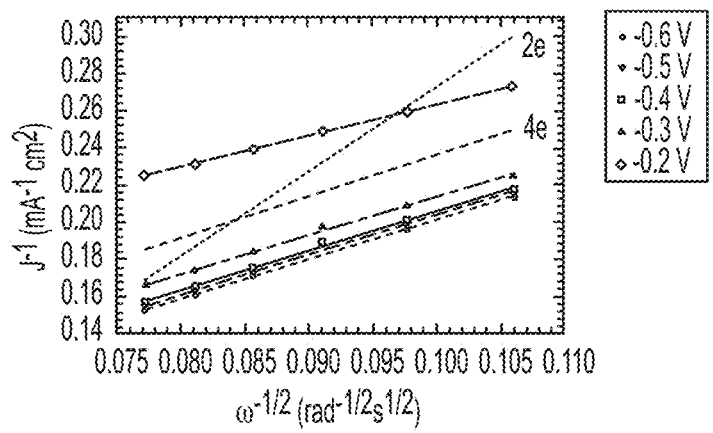
Figure 10C:
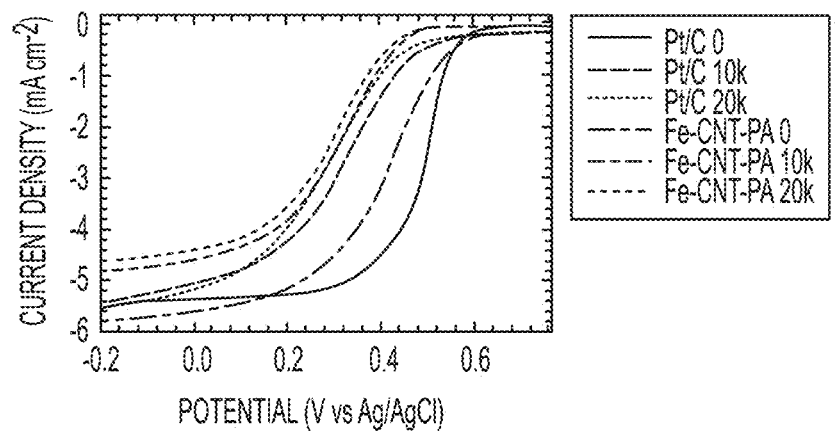
FIG. 10C and FIG. 10D are graphs showing RDE polarization curves of Fe-CNT-PA at different cycle numbers in $O_2$ saturated 0.5M $H_2SO_4$ and $O_2$-saturated 0.1M KOH, respectively.
Figure 10D:
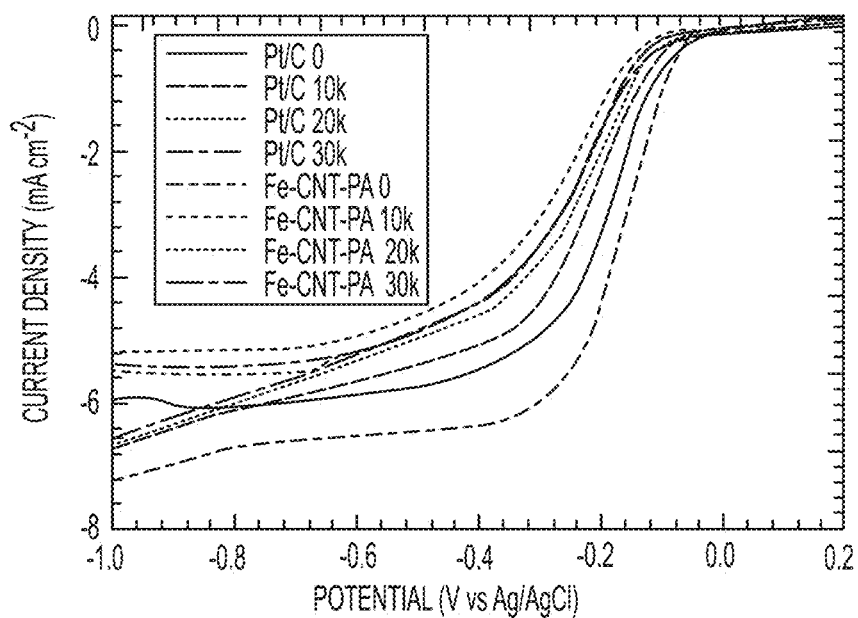

The Koutecky-Levich plots of FIG. 10A and FIG. 10B were obtained from the results at 6 different rotational speeds of the electrode, starting from 1600 rpm to 850 rpm (every 150 rpm) 150 pm. The RDE polarization curves of FIG. 10C and FIG. 10D of Fe-CNT-PA were compared with those of commercial Pt/C (20-wt % Pt) before and after 10000, 20000, and/or 30000 CV cycles. The rotating speed and scan rate of all curves in (a) and (d) is 1600 rpm and 5 mV s$^{-1}$, respectively.

More importantly, the long-term stability testing of Fe-CNT-PA in both 0.5M H$_2$SO$_4$ (e.g., see FIG. 10C) and 0.1M KOH (e.g., see FIG. 10D) shows better limiting current density retentions than those of Pt/C. The reduction of the half-wave potential for Fe-CNT-PA and Pt/C was 0.13 V and 0.21 V, respectively, after 20,000 cycles in O$_2$-saturated 0.5M H$_2$SO$_4$. In O$_2$-saturated 0.1M KOH, the half-wave potentials of Fe-CNT-PA and Pt/C respectively decreased by 0.13 V and 0.11 V after 30,000 cycles. In particular, the high stability of the Fe-CNT-PA is remarkable since non-precious metal or metal oxide based catalysts in such a harsh acidic environment usually show rapid and severe degradation due to the decomposition of catalyst structures and the protonation reaction. In fact, the initial catalytic performances of various complexes such as multi-wall carbon nanotubes with cobalt porphyrin, carbon nanofibers pyrolyzed with of iron, polypyrrole, and ethylenediamine, and carbon black pyrolyzed with polymerized p-phenylenediamine and ferric chloride were comparable to Pt/C in 0.5M H$_2$SO$_4$. These studies, however, did not show such long-term stability.

Fe-CNT-PA catalysts also outperformed recently-reported relatively-stable non-precious metal based catalysts tested in 0.5M H$_2$SO$_4$. For example, the limiting current density of the Fe-CNT-PA dropped ~9% after 20,000 cycles (e.g., see FIG. 10C), but carbon particle complexes made by sintering Fe, C, and polyaniline exhibited a similar drop after only 5,000 cycles. It is also worth noting that Fe-CNT-PA was cycled under O$_2$-saturated 0.5M H$_2$SO$_4$, while the carbon particle complexes were cycled under N$_2$-saturated 0.5M H$_2$SO$_4$. The higher O$_2$ concentration normally leads to a higher degradation rate of such catalysts, which implicates that Fe-CNT-PA has an excellent long-term stability maintaining the active site even in the harsh environment.

Furthermore, in 0.1M KOH, the half-wave potential from the Fe-CNT-PA is 15 mV and 120 mV higher than those of aerogel hybrids made of iron nitride and nitrogen doped graphene and nitrogen-doped graphene, respectively, and similar to those of polyaniline-derived N-/O-doped mesoporous carbons, and nitrogen-doped gelatin-carbon black sheets. In terms of stability, degradations of the Fe-CNT-PA were marginal even after 30,000 cycles in O$_2$ saturated 0.1M KOH, resulting in 0.13 V drop of the half wave potential and 8% reduction in the limiting current density, which is comparable to or better than the recently reported.

Additionally, methanol tolerance was investigated in both acidic (0.5M H$_2$SO$_4$) and basic (0.1M KOH) solutions in the presence of 1.0M methanol. CV results demonstrated Fe-CNT-PA did not show noticeable peaks corresponding to methanol oxidation (e.g., see the solid lines in FIG. 14). On the contrary, Pt/C showed prominent peaks corresponding to methanol oxidation in both acidic and basic solutions (dashed lines in FIG. 14), suggesting better catalytic selectivity of the Fe-CNT-PA than that of Pt/C.

Specific surface area is an important factor for ORR catalysts. Brunauer-Emmett-Teller (BET) tests (Micrometrics ASAP 2020 physisorption analyzer) were conducted, as well as calculating theoretical specific surface area of the CNT sponge with the following relation.

$$\text{Specific surface area} = \frac{1315 d_e}{n d_e - 0.68\left[\sum_{i=1}^{n-1} i\right]}$$

where $d_e$ is the external diameter of CNTs (122~131 nm) and n is the number of shells in an individual CNT which can be calculated by dividing the shell thickness with the interlayer distance (0.34 nm) of graphitic layers. The shell thickness is half of the difference between external diameter and the inner diameter (24~50 nm) of the tube. The BET test showed the specific surface area of our pristine CNT sponge was found to be ~11 m$^2$/g, which is close to calculation results of 14~18 m$^2$/g.

Working Examples

Synthesis and Characterization

A precursor solution to synthesize CNT catalysts, were made by dissolving ferrocene powders (Sigma-Aldrich, 98%) in a 1:1-ratio mixture of aniline (Alfar Aesar, 99+%) and pyridine (Alfa Aesar, 99+%) with a concentration of 60 mg ferrocence per mL. Aniline and pyridine were used to obtain a nitrogen-doped graphitic structure, and iron from ferrocene was used as a catalyst to grow CNTs as well as N—Fe—C coordination for a high catalytic activity. To compare the influence of nitrogen doping precursors, aniline only was used, or pyridine only, instead of mixing half and half. Additionally, to investigate the influence of iron coordination, CNTs were grown without incorporating iron during the growth of CNTs, labeled as A/P-CNT in Table 10, and nitrogen doping effects were studied by growing CNTs using nitrogen-free C$_2$H$_4$ instead of aniline or pyridine, labeled as Fe-CNT in Table 10.

To synthesize the samples except Fe-CNT, a quartz tube whose inner diameter is 22 mm was initially purged with 900-sccm Ar (Airgas, 99.999%). The quartz tube was placed in a three zone tube furnace (Lindberg Blue M, Thermo Scientific) whose target temperatures for the 1st and 3rd zone were set to 250° C. and 950° C., respectively. The tip of a needle for feeding the precursor solution was located at the middle of the 1st zone. After the target temperatures were reached in ~12 min, 250-sccm H$_2$ (Airgas, 99.999%) was added to the Ar flow. The mixture solution was continuously injected into the furnace tube with a rate of 0.1 mL/min using a syringe pump. After finishing the reaction, the Ar flow rate was decreased to 100 sccm while the hydrogen flow was turned off. The products were gathered after the quartz tube was cooled to room temperature. Typically ~100 mg catalysts were obtained with 20-min reaction time. To have A/P-CNT, iron (6 nm) and aluminum (10 nm) films were deposited as catalyst layers to grow CNTs using an e-beam evaporator on a Si wafer. A mixture of aniline and pyridine (1:1 by volume) without ferrocene was used as a precursor solution. Except ferrocene in the precursor solution, other synthesis conditions to obtain A/P-CNT were the same as those for other Fe/N-containing CNT catalysts.

To synthesize Fe-CNT, an alumina crucible filled with 120-mg ferrocene was placed in the 1st zone, and 120° C. and 800° C. were set for the 1st and 3rd zone of the tube furnace with a ramping rate of 80° C./min. Initially 200-sccm Ar was flowed until the target temperatures were reached, and then 80-sccm C2H4 (Airgas, 99.999%) and 200-sccm $H_2$ were added to the Ar flow. After 20 minutes of reaction, ~30 mg of Fe-CNT catalysts were typically obtained.

The morphology of the samples was inspected using a scanning electron microscope (SEM, FEI Quanta 600) and transmission electron microscope (TEM, JEOL JEM 2010). The composition of the samples was analyzed using X-ray photoelectron spectroscopy (XPS, Omicron ESCA+) with a charge correction by carbon is at 284.8 eV as a reference as well as thermogravimetric analysis (TGA, TA Instruments Q500) at 40~900° C. in air with a heating rate of 5° C./min. Raman spectroscope analysis was conducted by Horiba Jobin-Yvon LabRam Raman Confocal Microscope to study the graphitic nature of CNTs.

Electrochemical Measurements

The catalyst samples (7 mg) were dispersed in a mixture of DI water (500 μL), ethanol (170 μL, 92-94%, EMD Millipore), and 5-wt % Nafion solution (160 μL, Fuel cell earth) with a pen type sonicator (FB-120, Fisher Scientific) with 120 W for 10 minutes. The catalyst ink (5 μL) was loaded on a glassy carbon electrode (BASi) whose active electrode area is 3 mm in diameter, and then dried in an oven at 40° C. for 120 minutes. For comparison, commercial Pt/C (20-wt % Pt, Fuel cell earth) was also made into ink with the same method.

Rotating disk electrode (RDE) and cyclic voltammetry (CV) experiments (604D CHI electrochemical station) were performed in 0.1 M KOH electrolyte with an Ag/AgCl electrode in saturated KCl (0.197 V vs. SHE) as a reference electrode, a Pt wire as a counter electrode, and the samples as a working electrode. Oxygen or nitrogen (100 sccm) was continuously purged to the electrolyte, and CV and RDE tests began after 30 minutes gas purging. In the RDE test, the working electrode was rotated with variable rotating speeds of 850~1600 rpm at −1.0~0.2 V vs. Ag/AgCl with a scan rate of 5 mV/s. In the CV test, the measurement was conducted at −1.2~0.2 V vs. Ag/AgCl with a scan rate of 100 mV/s.

Morphology and Material Structure

As-synthesized Fe-A/P-CNT consists of aligned wavy CNTs whose lengths are over 100 μm. The CNTs have iron-containing nanoparticles and graphitic layered structures whose outer diameters are 30~70 nm. The curved graphitic layers may come from nitrogen doping in graphitic carbon, which may create curvatures in the graphene sheets due to pentagonal defects. With a single nitrogen-containing precursor, Fe-A-CNT samples also had wavy CNTs with larger curvatures, but those in Fe—P-CNT were rather straight. When iron was not delivered during the growth of CNTs for A/P-CNT, the CNT packing density was found to be higher than those of other iron/nitrogen-containing samples. The morphology of Fe-CNT samples is similar to that of Fe-A-P-CNT, but iron and nitrogen were not incorporated during the CNT synthesis process.

According to the intensity ratio ($I_D/I_G$) of D-band (~1330 $cm^{-1}$) to G-band (~1580 $cm^{-1}$) in the Raman spectra (e.g., see FIG. 23), the nitrogen-containing aniline and pyridine precursors resulted in higher intensity ratios compared to that of Fe-CNT, suggesting higher defect densities in the graphitic carbon structure. $I_D/I_G$ from Fe-A-CNT was the highest (1.41), and $I_D/I_G$ from Fe-A/P-CNT was 1.39, which is in the middle of those from Fe—P-CNT (1.21) and Fe-A-CNT. It was noticed that the waviness of CNTs shown in SEM images was intensified as $I_D/I_G$ gets higher. The CNTs in Fe-A-CNT have large curls in comparison to relatively straight CNTs in Fe-A/P-CNT, and the CNTs in Fe-A/P-CNT have those in between. These intensity ratio values were much higher than 0.82 from Fe-CNT, indicating nitrogen doping in the graphitic carbon structure.

Electrochemical Analysis

Figure 17A:
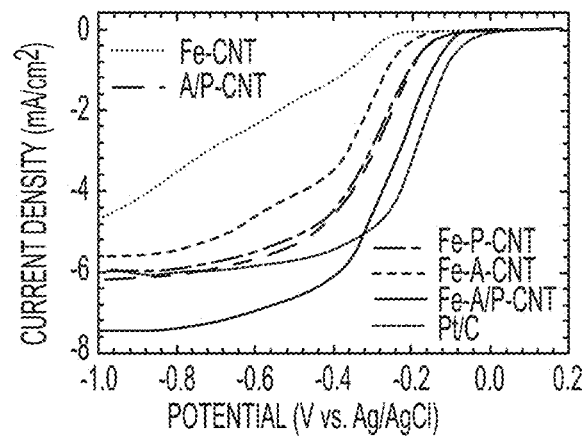
FIG. 17A is a graph showing RDE polarization curves of Fe-CNT, A/P-CNT, Fe—P-CNT, Fe-A-CNT, Fe-A/P-CNT, and Pt/C in $O_2$-saturated 0.1 M KOH electrolyte with 1600 rpm.

The RDE test results of FIG. 17A show that Fe-A/P-CNT has an onset potential comparable to that of Pt/C with a slightly lower half-wave potential (~72 mV difference), which is similar to the performance of other non-Pt based catalysts. Significantly lower onset potentials were observed from A/P-CNT and Fe-CNT, suggesting both nitrogen and iron are necessary to have high catalytic activity. In addition, A/P-CNT appears to have the two-step oxygen reduction reaction with onset potential at −0.36 V and −0.64 V. The larger limiting current density from Fe-A/P-CNT compared to that of Pt/C suggests a large amount of electrochemically active sites. It is noted that nitrogen doping by both aniline and pyridine resulted in better performances than those with a single dopant of aniline or pyridine.

Figure 17B:
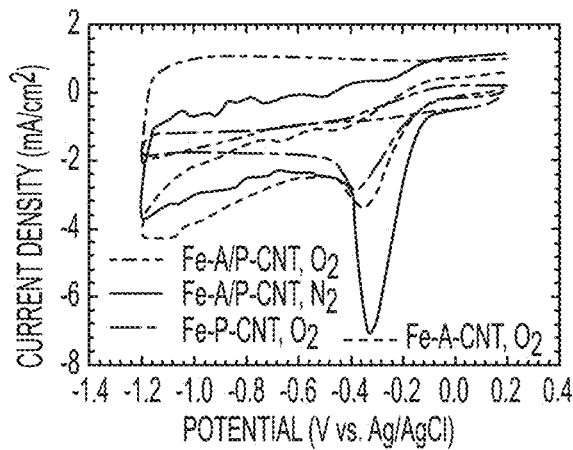
FIG. 17B is a graph showing CV results of Fe-A/P-CNT, Fe—P-CNT, and Fe-A-CNT in $N_2$- and $O_2$-saturated 0.1 M KOH electrolyte with a scan rate of 100 mV/s.
Figure 17C:
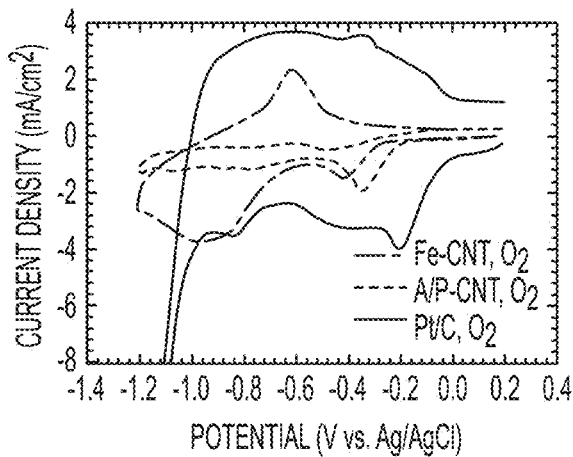
FIG. 17C is a graph showing CV results of Fe-CNT, A/P-CNT and Pt/C in $O_2$-saturated 0.1 M KOH electrolyte with a scan rate of 100 mV/s.

The high catalytic activity of Fe-A/P-CNT was also confirmed from CV results (e.g., see FIG. 17B). Fe-A/P-CNT has the ORR peak at −0.32 V in the oxygen environment, and this ORR reaction was confirmed by no ORR peaks in the nitrogen-saturated CV result. The maximum current density and peak potential for Fe-A/P-CNT were also larger than those of the samples with only one precursor (aniline or pyridine). The maximum current for Fe-A/P-CNT was even larger than that of Pt/C, and relatively poor performances from nitrogen- or iron-deficient samples (no iron for P-A-CNT and no nitrogen for Fe-CNT) were observed (e.g., see FIG. 17C).

The nitrogen and iron doping essential to high ORR activity was further analyzed by XPS. According to the survey scan (e.g., see FIG. 20), the nitrogen at %'s for Fe-A/P-CNT, Fe-A-CNT, and Fe—P-CNT are similar, but the iron at % of Fe-A/P-CNT is 8.6 times higher than that of Fe-A-CNT and 3.8 times higher than that of Fe—P-CNT. The relative ratios of iron in the samples are quite different from the TGA result. For example, the iron wt % of Fe-A/P-CNT is only 1.5 times higher than that of Fe-A-CNT. This different result is likely caused by different analysis methods of XPS and TGA. For example, XPS is designed to probe sample surfaces, and therefore it is ideal to analyze nitrogen-coordinated iron that is often present on the wall (graphitic layer) of CNTs. On the other hand, iron-containing particles embedded deep inside the CNTs can be detected by TGA rather than XPS.

Figure 18A:
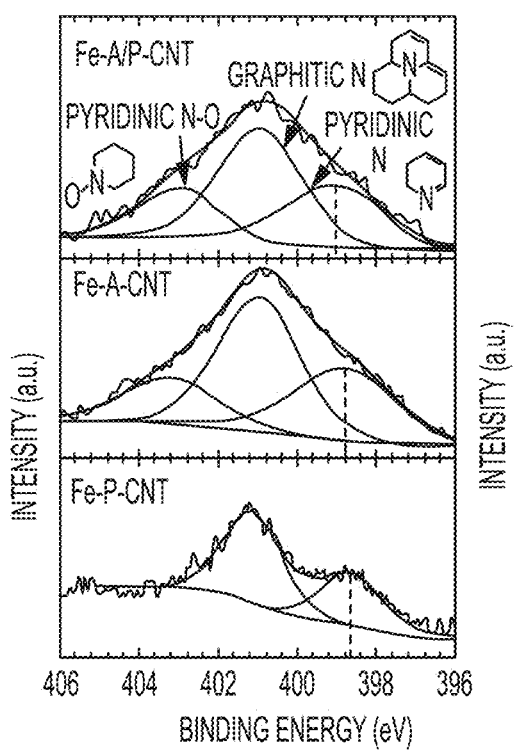
FIG. 18A is a graph of N–1 s XPS showing relative intensity versus binding energy for Fe-A/P-CNT, Fe-A-CNT and Fe—P-CNT.
Figure 18B:
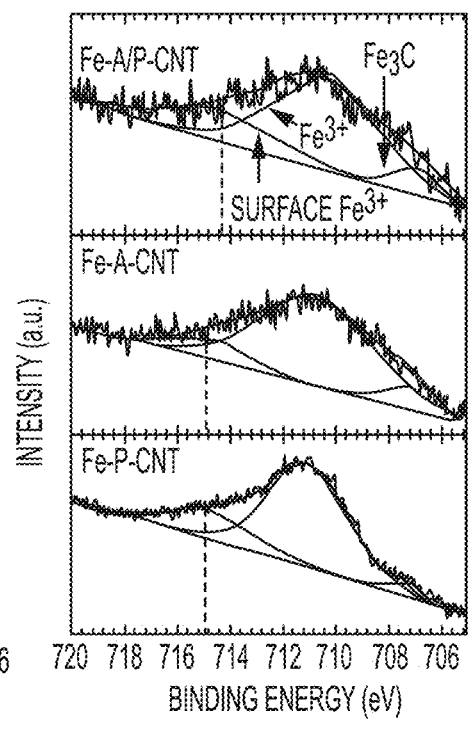
FIG. 18B is a graph of Fe-2p showing relative intensity versus binding energy for Fe-2p XPS results of Fe-A/P-CNT, Fe-A-CNT and Fe—P-CNT.

FIG. 18A shows N–1s XPS spectrum, which can be separated into pyridinic N at ~398.8 eV, pyrrolic N at ~400.9 eV, and oxidized pyridinic N at ~403.2 eV. A notable difference in the $N^{-1}s$ spectra is the shift of the peak corresponding to the pyridinic nitrogen of Fe-A/P-CNT to a higher binding energy, compared to those of Fe-A-CNT and Fe—P-CNT, indicating nitrogen coordination with iron. The Fe-2p spectrum can be also separated into $Fe_3C$ at ~707.1 eV, bulk $Fe_3+$ at ~710.6 eV, and surface $Fe^{3+}$ at ~714.2 eV (e.g., see FIG. 25B). The peak shift of the surface $Fe^{3+}$ in Fe-A/P-CNT toward a lower binding energy also indicates the stronger coordination of iron with pyridinic nitrogen.

Figure 19A:
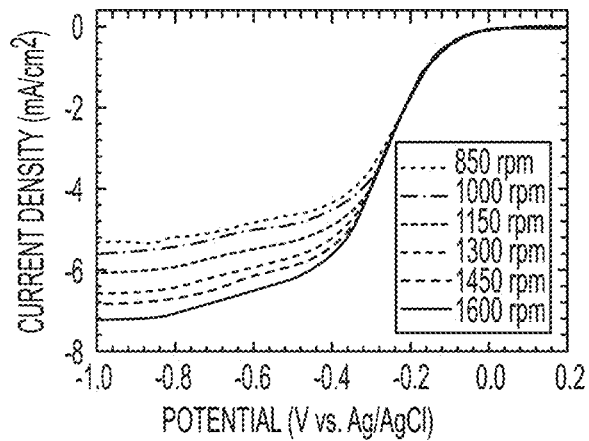
FIG. 19A is a graph showing RDE polarization curves of Fe-A/P-CNT in $O_2$-saturated 0.1 M KOH electrolyte at 6 different rotational speeds of the electrode, starting from 1600 rpm to 850 rpm (every 150 rpm)
Figure 19B:
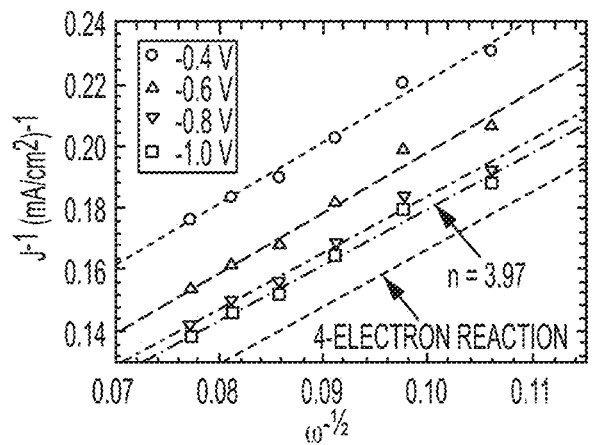
FIG. 19B is a graph showing Koutecky-Levich plots for Fe-A/P-CNT from the RDE results of FIG. 26.

RDE tests of Fe-A/P-CNT at different rotational speeds were performed (e.g., see FIG. 19A), indicating the four-electron reaction according to the Koutecky-Levich plot at various potentials (e.g., see FIG. 19B). The Koutecky-Levich plots were obtained by the Koutecky-Levich equation.

Figure 19C:
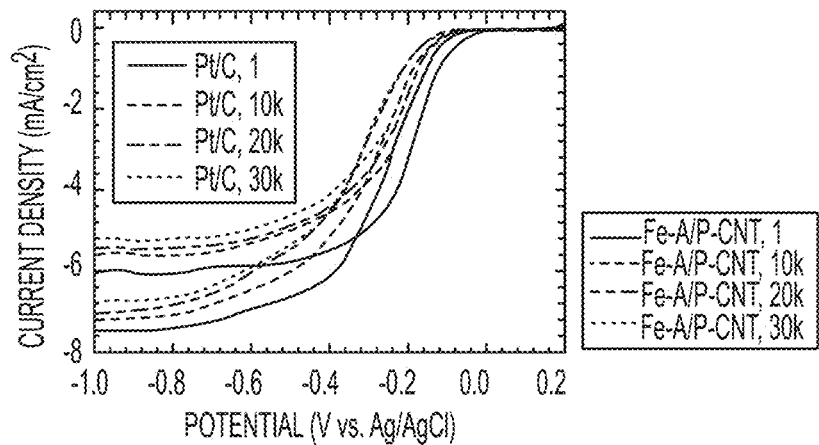
FIG. 19C is a graph showing the RDE polarization curves of FIG. 26 compared with those of commercial Pt/C before and after 10,000, 20,000, and 30,000 CV cycles.

A good, long-term stability of Fe-A/P-CNT was confirmed in the RDE test. 30,000 cycles in oxygen-saturated 0.1 M KOH. After 30,000 cycles, the decrease of the half-wave potential for Fe-A/P-CNT and Pt/C were 64 mV and 71 mV (e.g., see FIG. 19C), respectively, and the limiting current density of Fe-A/P-CNT dropped ~10%, which is similar to or better than the recent reports. In addition, the half-wave potential for Fe-A/P-CNT is higher than nitrogen doped carbon based nanostructures and nitrogen doped graphene. These results demonstrate the good stability of Fe-A/P-CNT for oxygen reduction reaction.

Application to Microbial Fuel Cells

A bifunctional non-precious metal based electrocatalyst and self-standing sponge-like cathode was developed and 3-dimensional (3D) cathodes in microbial fuel cells were tested. Results showed outstanding catalytic activity and long term stability comparable to commercial Pt-based catalysts. The cathodes were composed of self-assembled carbon nanotubes whose carbon is coordinated with iron and nitrogen for high ORR performance. For maximum cell performance, it was determined that a large pore volume in the 3D cathode allows better oxygen diffusion, but overly porous cathodes have less active surface area, which results in lower power generation. The findings regarding the dependency of power generation on oxygen diffusion/reaction and active surface area (or mass) provide a guidance to future development of porous 3D electrocatalysts/cathodes. A new way of designing electrocatalysts/cathodes from conventional two-dimensional films to macroscale 3D self-assembled nanomaterials—with only ~1% cost of commercial Pt-based catalyst powders—will eliminate a major hurdle in deploying electrochemical energy conversion systems.

Microbial fuel cell (MFC) is a promising renewable energy technology for the production of electrical energy during wastewater treatment. Electrochemically active bacteria (EAB) oxidize organic compounds and transfer electrons to the anode. The electrons move through an external circuit to the cathode where the electron acceptors are reduced. Various electron acceptors such as ferricyanide and permanganate have been used in the cathode to improve the power generation, but they are not considered to be ideal cathode reactants due to toxicity, non-sustainability, and cost issues. Oxygen is a cost-effective, sustainable, nature-friendly, and scalable electron acceptor for practical applications. However, the slow rate and high overpotential of the ORR are the two critical issues that limit the performance of MFCs. There are two different chemical pathways—two and four electron—through which oxygen is reduced to hydrogen peroxide or water. The two-electron pathway exhibits a high overpotential for ORR, which is less efficient than the four-electron pathway, which is normally observed with precious-metal based catalysts. Thus, it is essential to develop low-cost ORR catalysts without sacrificing the performance of Pt-based catalysts.

Various catalysts have been proposed such as biocathodes (biofilm grown cathode), conductive polymers (polyaniline, polypyrrole), macrocyclic compounds (Co-naphthalocyanine, pyrolyzed iron ethylenediaminetetraacetic), metal oxides (manganese dioxide, lead oxide), and carbon based (carbon nanotubes (CNTs), graphene, activated carbon nanofibers) materials. Recently, CNT-hybrid cathodes containing Pt, Mn $O_2$, chitosan, and iron phthalocyanine (FePc) have displayed promising properties such as low cost and improved ORR activities mainly due to the large surface area and good conductivity of CNTs. Moreover, their high mechanical strength and excellent chemical stability have contributed to the development of durable cathodes. Nevertheless, power generation and stability with these catalysts are typically inferior to those of conventional Pt-based catalysts, or/and their synthesis processes are too complicated to be viable in practice.

Three-dimensional nitrogen-enriched iron-coordinated CNT (N/Fe-CNT) sponges for use as high-performance cathodes can be fabricated using simple and low-cost fabrication processes. A two-stage CVD process was used to synthesize a self-assembled 3D framework consisting of intertwined nitrogen-enriched CNTs. The structure and chemical composition of the N/Fe-CNT sponge were investigated by scanning/transmission electron microscopy (SEM/TEM), X-ray diffraction (XRD), X-ray photoelectron spectroscopy (XPS), and Raman spectroscopy. The performances of the N/Fe-CNT-loaded MFCs were experimentally obtained using wastewater in anode chambers, and compared with that of MFCs with commercial Pt/C-coated carbon cloth (Pt-CC) cathodes. Cyclic voltammetry (CV) and rotating disk electrode (RDE) tests were also conducted to evaluate the electrocatalytic activity for ORR.

Pristine CNT sponges were formed at the end of the first stage of the synthesis process, and a nitrogen doping process was carried out at a higher temperature in the second stage. The form of the as-synthesized N/Fe-CNT sponge (e.g., see FIG. 21A) reflects the cylindrical shape of a quartz furnace tube in which the sponge was synthesized, and no fracture was observed even with 90°-bending (e.g., see FIG. 5B). The self-standing and deformable features differentiate the N/Fe-CNT sponge from other catalysts previously reported for MFC cathodes, which require an additional catalyst loading layer such as carbon cloth and carbon paper due to their powdery catalysts. The additional catalyst loading layer will not only add extra cost to MFCs but also increase the internal resistance of cathode.

Figure 21:
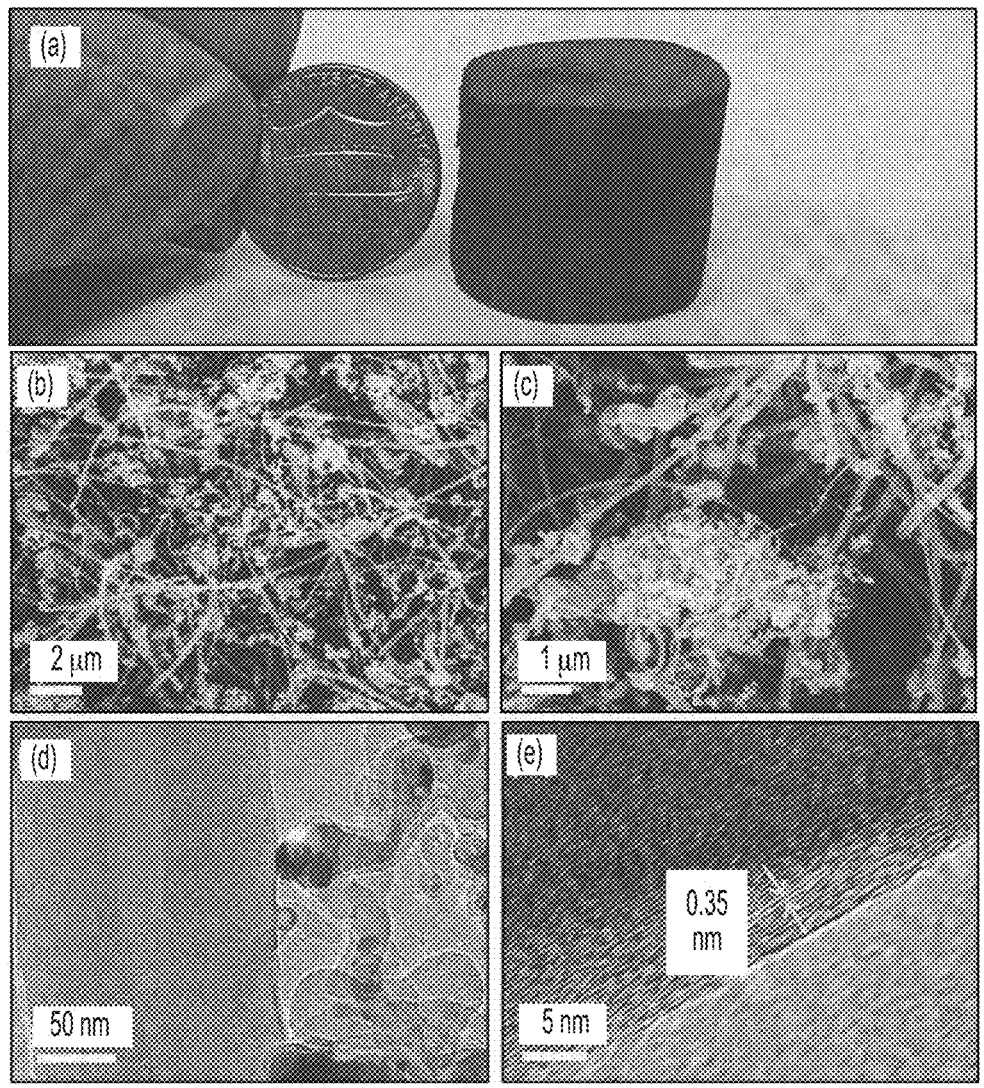
FIG. 21 shows a photograph of an as-synthesized self-standing N/Fe-CNT sponge (a); SEM images of a N/Fe-CNT sponge showing small intertwined CNTs and small aggregates attached to walls of CNTs (b and c); and TEM images of N/Fe-CNT showing graphitic layers of multi-wall CNTs (d and e)

SEM images shown in FIG. 21B and FIG. 21C demonstrate that the resulting structure of CNTs was randomly oriented and intertwined, creating porous 3D sponge-like frameworks. A post-treatment with pyridine at 800° C. generated small aggregates composed of carbon and iron compounds on walls of the CNTs (e.g., see FIG. 21C and FIG. 21D). FIG. 21E is a HRTEM image showing that inner walls of the CNTs were composed of more ordered graphitic layers compared to the less ordered outer walls due to the nitrogen incorporation. The graphitic structure ensures a high electrical conductivity, which is important in charge transfer processes during ORR.

In the XRD pattern of the N/Fe-CNT sponge (e.g., see FIG. 22A), the peak at 26.2° corresponds to (0 0 2) planes of concentric graphitic carbon, which indicates the interlayer distance of 0.34 nm (close to 0.35 nm measured from the HRTEM image shown in FIG. 21E) according to the Bragg's law. Other peaks were assigned to iron or iron-carbon compounds ($Fe_3C$ and $Fe_{15.1}C$). No peak associated with nitrogen-containing compounds was found in the XRD result, suggesting nitrogen was mostly incorporated into the graphitic carbon (e.g., pyridinic and graphitic nitrogen) or amorphous iron-nitrogen compounds. Raman spectra (e.g., see FIG. 22B), therefore, were taken to investigate the effect of nitrogen incorporation into the graphitic carbon structure. The Raman spectra of both pristine CNT sponge and N/Fe-CNT sponge displayed D-band (~1330 $cm^{-1}$) and G-band peaks (~1572 $cm^{-1}$) of graphitic materials. The D-band is associated with a double resonance effect by defects, while the G-band is related to the in-plane vibration mode of $sp^2$ carbon. The intensity ratio of the D-band to G-band ($I_D/I_G$) qualitatively indicates the crystallinity of the graphitic carbon structure. $I_D/I_G$ is higher for N/Fe-CNT sponge (0.81) compared to CNT sponge (0.44), suggesting disordered structures induced by the nitrogen incorporation.

The chemical structure and composition of the N/Fe-CNT sponge were further characterized by XPS (e.g., see FIG. 25), revealing the presence of carbon, nitrogen, oxygen, and iron, which is consistent with the elements in the precursors. The high-resolution scan of N is (e.g., see FIG. 22C) displayed two components corresponding to the pyridinic nitrogen (398.4 eV) and graphitic nitrogen (401.0 eV). The pyridinic nitrogen is bonded with two carbon atoms, contributing one p-electron to the conjugated π system, having a lone pair of electrons positioned in plane with the graphitic carbon. The graphitic nitrogen is bonded with three carbon atoms by replacing the original carbon atoms in the graphitic plane. These nitrogen groups were intentionally made with the pyridine precursor since they are essential in improving the catalytic activity of the carbon-based catalysts for ORR. The nitrogen composition was found to be ~2% according to the XPS results (e.g., see FIG. 25).

Four different N/Fe-CNT sponges were tested as cathodes, as listed in Table 3, to investigate their performances for power generation in two-chamber MFCs (20-mL each for cathode and anode chambers). Characteristics of tested cylindrical N/Fe-CNT sponge samples having a diameter is 20 mm were tested. Pore volumes are average values calculated with CNTs whose outer/inner diameters and density are respectively 150/20 nm and 2.2 g $cm^3$.

The variation in the tested samples was designed to identify the best pore volume per electrode mass (or surface area) as well as to investigate the dependency of power generation on electrode mass (or surface area). For ORR, the pore volume per mass is closely related to oxygen diffusion, while the mass of the CNT sponge is proportional to its active surface area. Note that mass was used as an indicator of the electrode surface area, which is estimated to be 19 $m^2$ per gram of CNT. For comparison, a single side of Pt/CC was loaded with Pt/C and then cut into two squares (1.8×1.8 $cm^2$). The two pieces were then attached using silver epoxy so that the Pt/C loaded sides were facing opposite each other and the Pt/C were in direct contact with the solution during MFC testing. The thickness of the single Pt-CC sheet was measured to be 0.35 mm. The area of the 2D Pt-CC (3.2 $cm^2$) was chosen to be close to the cross sectional area of the 3D N/Fe-CNT samples (3.1 $cm^2$). This design allowed investigation of the influence of porous structures on MFC performance. The anode was made of 1×1 $cm^2$ carbon felt (same size for all testing), and all other conditions were kept the same.

Figure 23A:
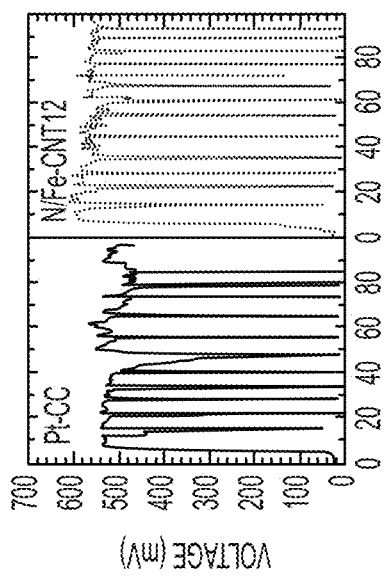
FIG. 23A is a graph showing voltage vs time for Pt-CC and N/Fe-CNT12.
Figure 23B:
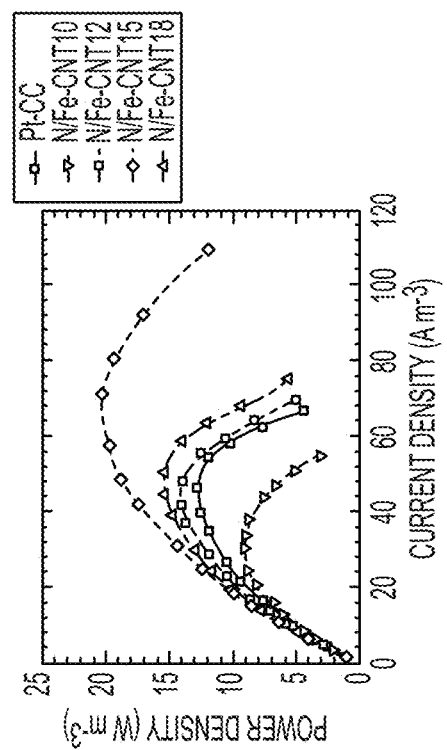
FIG. 23B is graph showing power density vs current density for Pt-CC, N/Fe-CNT10, N/Fe-CNT12, N/Fe-CNT15, and N/Fe-CNT18.

Five MFCs loaded with N/Fe-CNT10, N/Fe-CNT12, N/Fe-CNT15, N/Fe-CNT18, and Pt-CC cathodes were constructed and tested in a batch mode. FIG. 23A shows the output voltage as a function of time over 3 months with a 1500-Ω external resistor for N/Fe-CNT12 and Pt-CC cathodes. Both cells demonstrated negligible degradation over 3 months, and the N/Fe-CNT loaded cell showed slightly higher output voltage, indicating excellent stability and activity. Volumetric power densities based on anode chamber volume (20 mL) at steady power production stages were also obtained (e.g., see FIG. 23B). The maximum power densities of N/Fe-CNT12 (14.1 W $m^{-3}$) and Pt-CC (12.8 W $m^{-3}$) loaded MFCs were similar, but N/Fe-CNT10 loaded MFC, which is shorter than N/Fe-CNT12, had a lower maximum power density (9.1 W $m^{-3}$). The longer N/Fe-CNT15 and N/Fe-CNT18 resulted in higher maximum power densities compared to the MFCs with N/Fe-CNT12 and N/Fe-CNT10.

Figure 23C:
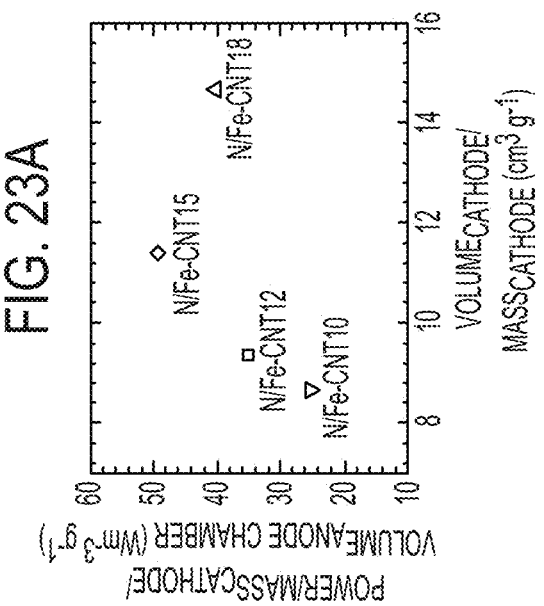
FIG. 23C is a graph showing volumetric power produced per cathode mass with the change of pore volume per cathode mass.
Figure 23D:
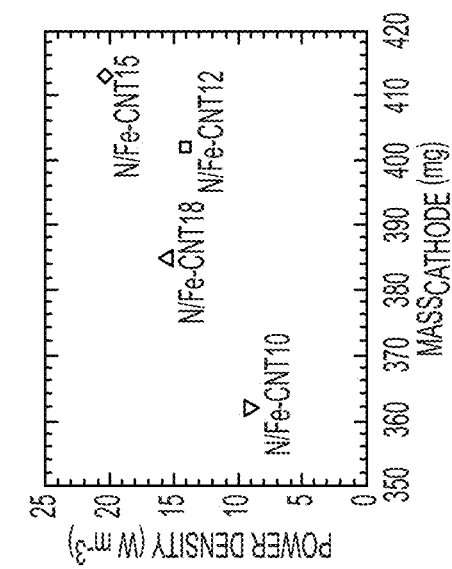
FIG. 23D is a graph showing volumetric power per cathode mass.
Figure 26:
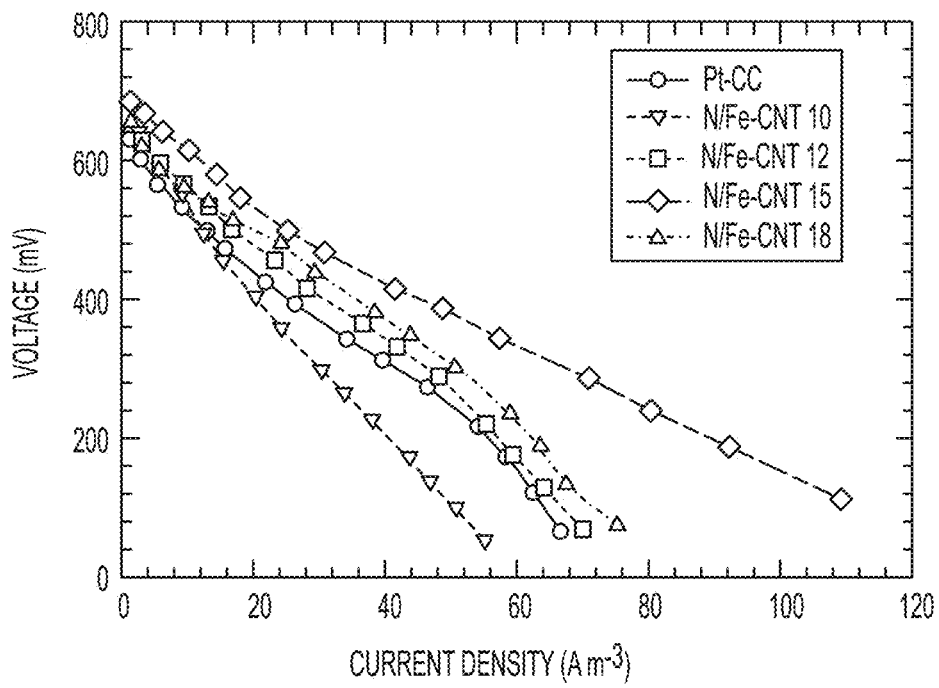
FIG. 26 is a graph of polarization curves of all MFCs equipped with N/Fe-CNT sponge and the Pt-CC cathodes.

However, as for the MFCs with the two highest maximum power densities, the shorter N/Fe-CNT15 (20.3 W $m^{-3}$) produced higher power than the longer N/Fe-CNT18 (15.4 W $m^{-3}$). This trend in the power density is related to the competing effects caused by the active surface area and the oxygen diffusion/reduction rate, which are respectively proportional to the mass of the CNT sponge and the pore volume per cathode mass. As shown in FIG. 23C, the volumetric (anode volume) power produced per cathode mass increased with the enlarged pore volume per cathode mass until it reaches 11.4 $cm^3/g$ (N/Fe-CNT15). This power density dropped when the pore volume per cathode mass was further raised to 14.7 $cm^3/g$ (N/Fe-CNT18). The initial increase in the power per cathode mass, which indicates the productivity of cathode by normalization with cathode mass, suggests that the reaction is strongly influenced by oxygen supply. Smaller pore volumes may result in insufficient oxygen conditions (lack of electron acceptors) due to limited oxygen diffusion, thereby retarding ORR. The power drop for N/Fe-CNT18 is likely to come from the less active material (385 mg) compared to 413 mg for N/F-NCNT15, as shown in FIG. 23D. This may suggest that the pore volume in NCNT15 is large enough for sufficient oxygen supply. Despite the larger cathode mass of N/Fe-NCNT12 than that of N/Fe-NCNT18, the power generation from N/Fe-CNT12 and N/Fe-CNT18 was similar (e.g., see FIG. 23D), which could be attributed to the smaller pore volume in N/Fe-NCNT12 (e.g., see FIG. 23C). Additionally, polarization curves of all cathodes showing voltage with respect to current density were compared in FIG. 26.

Figure 24A:
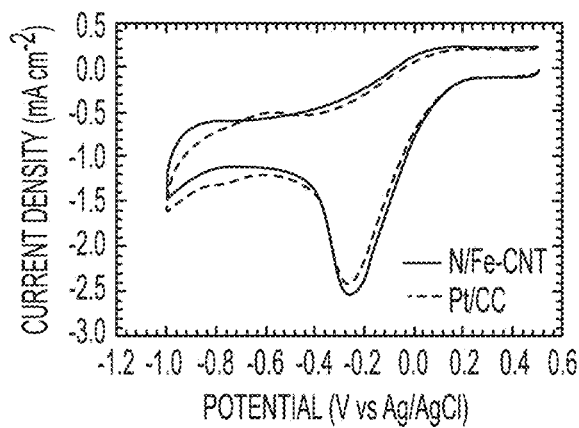
FIG. 24A is a graph of CV results of N/Fe-CNT and Pt/C catalysts showing strong oxygen reduction peaks.

In order to uncover the reason behind the high performance of the N/Fe-CNT sponges as cathodes for MFCs, electrochemical properties of the N/Fe-CNT sponges were further characterized by CV and RDE tests. In both tests, the catalysts (N/Fe-CNT sponge and Pt/C) were made into catalyst ink and then dropped on glassy carbon electrodes followed by drying (see the experimental part). According to the CV results (e.g., see FIG. 24A) in $O_2$-saturated 50-mM phosphate buffer solution (PBS) (pH=7.4), strong oxygen reduction peaks were observed for both N/Fe-CNT and Pt/C. The resemblance of the peak location and intensity suggests similar catalytic activity for ORR.

Figure 24B:
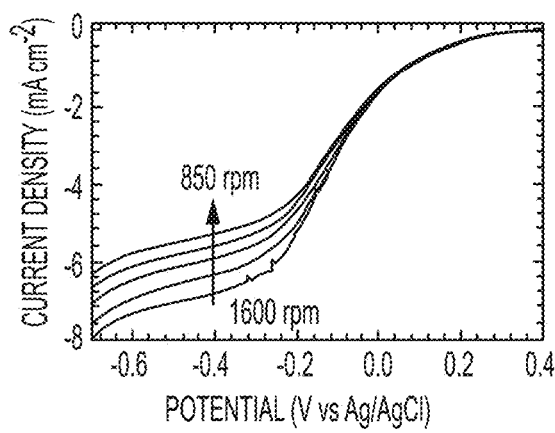
FIG. 24B is a graph of RDE test results of N/Fe-CNT in $O_2$-saturated 50 mM PBS.
Figure 24C:
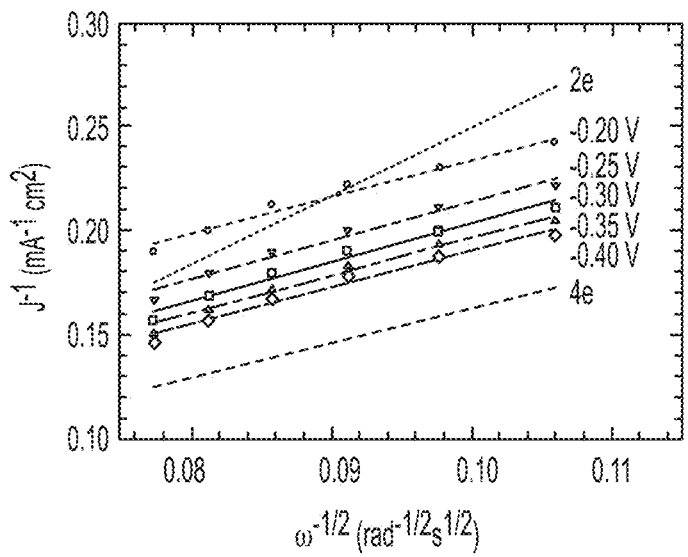
FIG. 24C is a graph showing Koutecky-Levich plots of N/Fe-CNT.
Figure 24D:
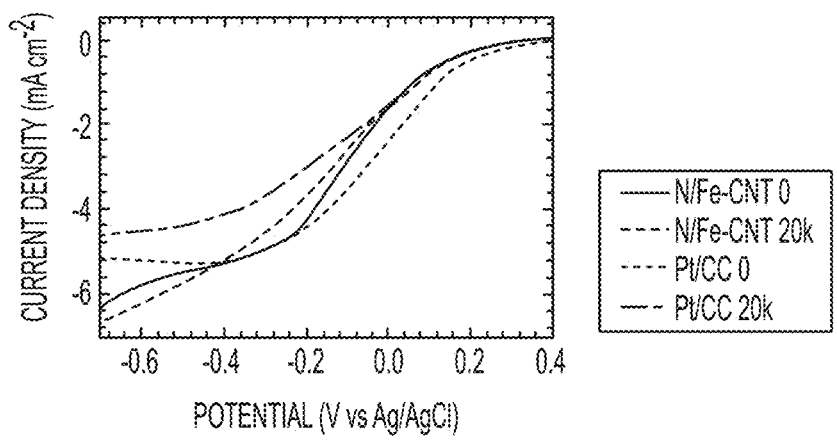
FIG. 24D is a graph showing RDE test results (1,000 rpm) of N/Fe-CNT and Pt/C before and after 20,000 CV cycles.
Figure 25A:
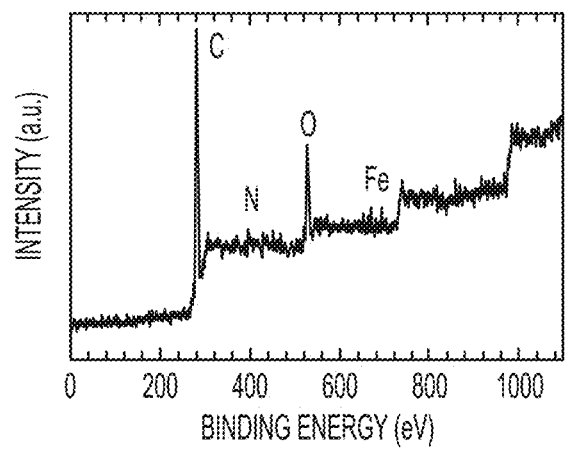
FIG. 25A is a survey scan showing relative intensity versus binding energy for C, N, O, and Fe.
Figure 25B:
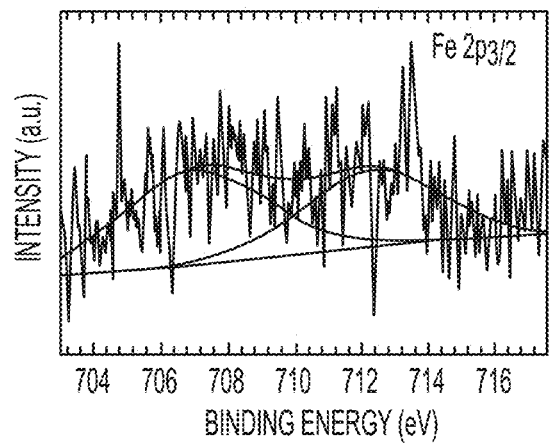
FIG. 25B, FIG. 25C and FIG. 25D are high-resolution scans of Fe $2p_{3/2}$, C is, and O 1s, respectively.
Figure 25C:
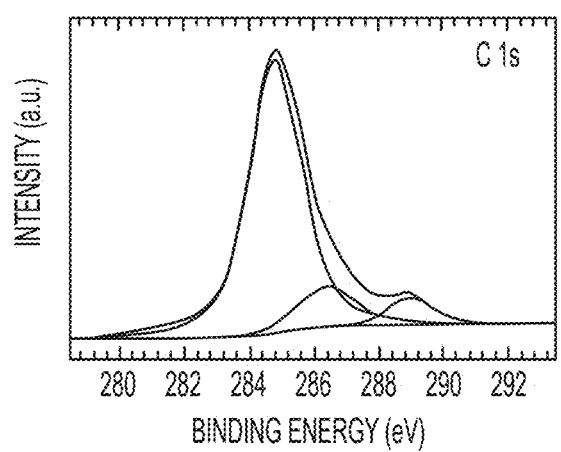
Figure 25D:
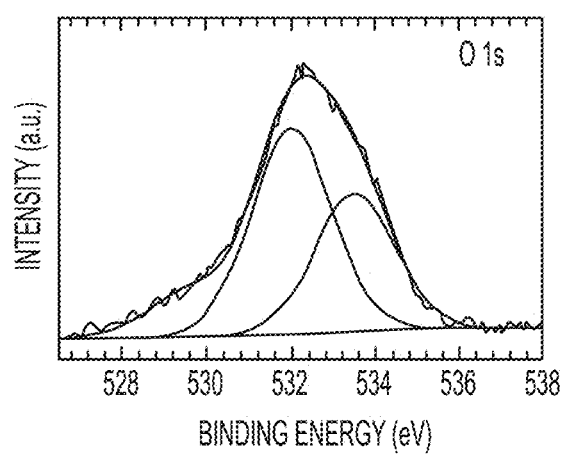
Figure 27A:
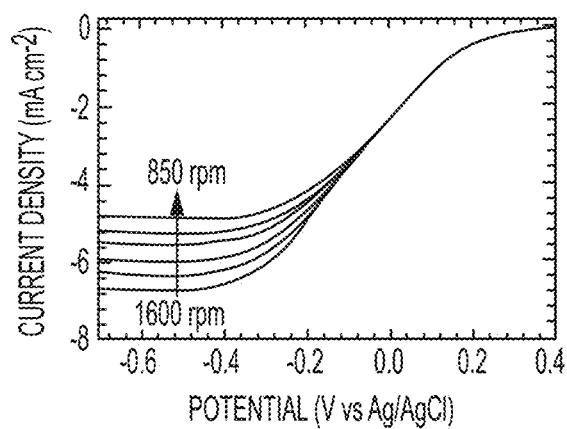
FIG. 27A is a graph of RDE test results of Pt/C in $O_2$-saturated 50 mM PBS.
Figure 27B:
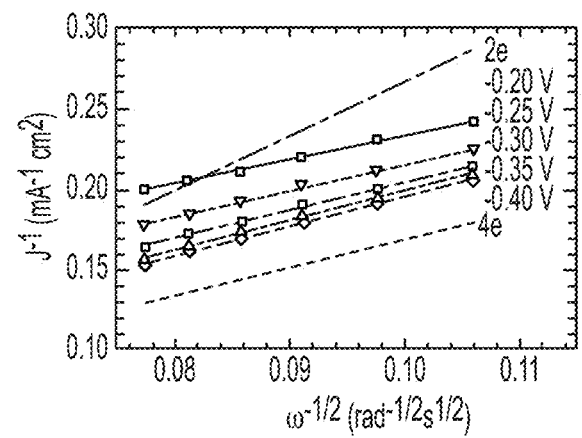
FIG. 27B is a graph of Koutecky-Levich plots of Pt/C, indicating the 4-electron ORR process.
Figure 28:
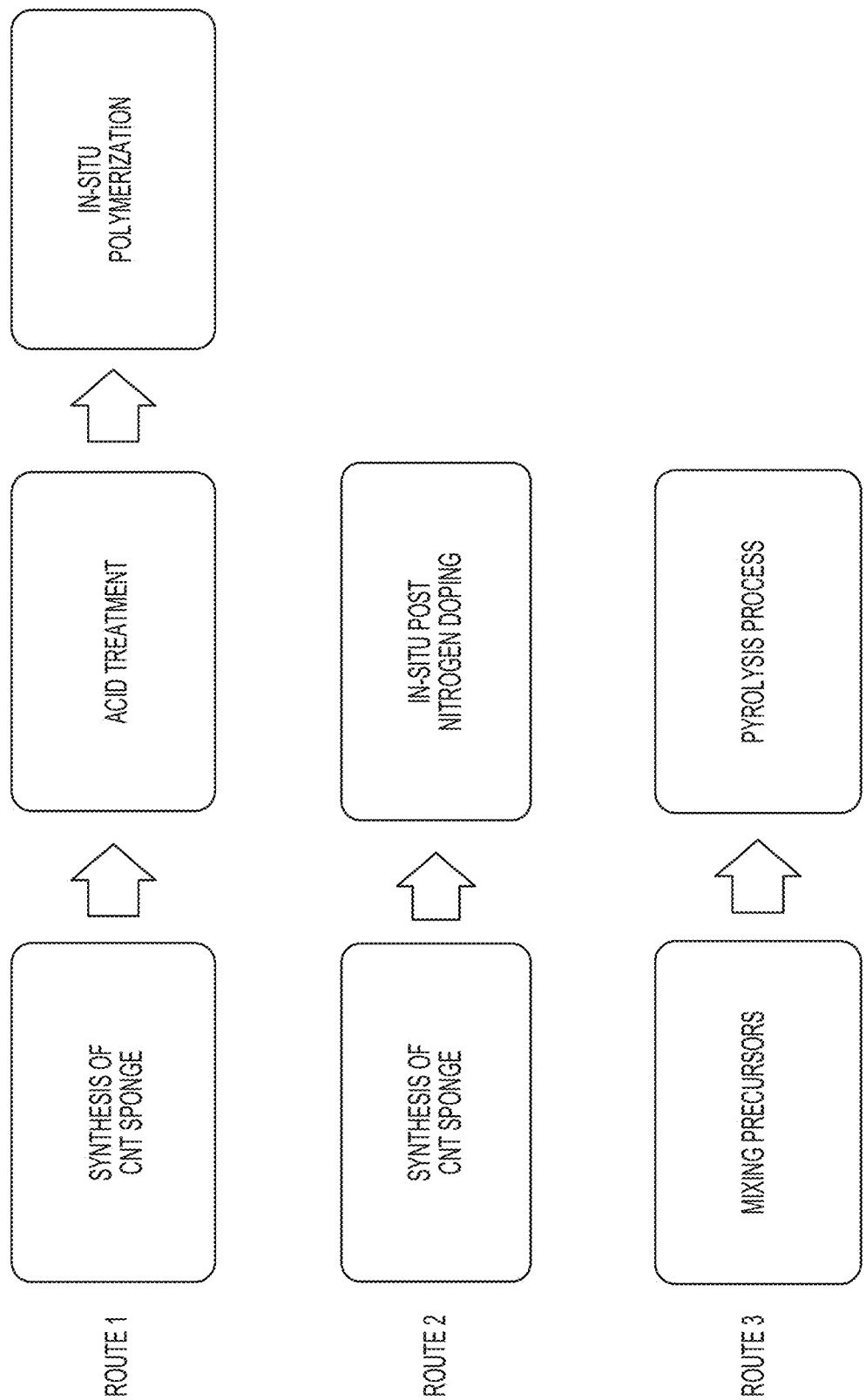
FIG. 28 shows a flow chart that sets forth three processes for the treatment of CNT sponges.

RDE tests for both N/Fe-CNT (e.g., see FIG. 24B) and Pt/C (e.g., see FIG. 24A) were performed in the same $O_2$-saturated 50 mM PBS with rotating speed changing from 1600 rpm to 850 rpm at 150 rpm interval. The inclined plateaus from N/Fe-CNT near −0.6 V vs Ag/AgCl, compared to relatively flat one from Pt/C, is likely to be caused by the porous structure of the catalysts as well as non-uniformity of catalytic sites. Oxygen accessibility of some catalytic sites in the porous structure is presumably different from others due to tortuous paths and carbonaceous clumps having different accessibility, which could become active with a higher potentials and/or longer reaction time. On the other hand, according to XPS results, the samples contain different kinds of ORR active sites such as pyridinic nitrogen, graphitic nitrogen, and their coordination with iron. Since different catalytic sites may participate in ORR at different ranges of potentials, multi-catalytic sites would have resulted in an inclined plateau as a whole, which has been explained using a model with different electrocatalytic sites. Koutecky-Levich plots were generated based on the RDE test results, as shown in FIG. 24C and FIG. 27B, respectively, for N/Fe-CNT and Pt/C. According to the Koutecky-Levich equation, there is a linear relation between $J^{-1}$ and $\omega^{-1/2}$ and the slope depends on the number of electrons involved in the reaction. The linear relation and similar slopes for both N/Fe-CNT sponge and Pt/C indicate the four-electron process, suggesting the efficient one-step ORR ($O_2 + 4H^+ + 4e^- \rightarrow H_2O$).

Two important aspects on the practicability of MFCs were also investigated: long-term stability and material/manufacturing cost of cathode. Stability is one of the most important aspects, particularly for non-precious metal based ORR catalysts. To investigate the stability of N/Fe-CNT sponge, it was cycled between −0.5 V and 0.1 V for 20,000 cycles followed by RDE test at 1,000 rpm. The results are presented together with those from Pt/C for comparison. After 20,000 cycles, the degradation of N/Fe-CNT was smaller than that of Pt/C, but both N/Fe-CNT and Pt/C were marginally degraded with similar limiting current densities and voltage shifts.

The high price of MFCs is a major hurdle for their wide deployment, mainly due to the prohibitive cost of Pt catalysts. Powdery Pt/C catalysts also require additional catalyst loading materials and processes, further increasing the manufacturing cost of MFC electrodes. Non-precious metal based catalysts typically involve complicated and long fabrication steps such as nitrogen-doped graphene, nitrogen-enriched Fe/Fe$_3$C-carbon nanorods, and nitrogen-doped CNTs. Although their initial power generation performances are comparable to those of their Pt/C electrodes, these systems may not be practically viable. The raw material costs of the N/Fe-CNT sponge and Pt/C were compared (not including catalyst loading layer).

It is striking that the cost of 1 g N/Fe-CNT sponge is only $0.69, which is about 1.4% of 1 g Pt/C ($50 g$^{-1}$). Furthermore, it is much cheaper than previously reported alternative catalysts with comparable performances as that of Pt/C.

The N/Fe coordination along with highly conductive porous CNTs described herein resulted in high-power generation and long-term stability, which are comparable to those from Pt/C-based MFCs. The excellent MFC performances with the N/Fe-CNT sponge cathodes can be attributed to the efficient four-electron ORR process according to the Koutecky-Levich plots from the RDE tests as well as the high catalytic activity according to the CV results. The distinct features of the N/Fe-CNT sponges include self-standing characteristics suitable for cathode without conducting substrates (e.g., carbon cloth/paper) or additional steps (e.g., catalyst loading process), as well as considerably lower material/manufacturing costs with performances comparable to those of precious metal loaded MFCs.

Preparation of N/Fe-CNT sponges: Sponge-like porous 3D CNTs were first synthesized using a CVD method in a three-zone tube furnace equipped with a quartz tube (inner diameter: ~22 mm). Without taking out the as-synthesized CNT sponge from the quartz tube, the furnace temperature was increased to 800° C. As soon as the reaction zone temperature reached 800° C., pyridine (Alfa Aesar, 99+%) was injected into the tube using a syringe pump (Model KDS-100, KD Scientific) at a feeding rate of 20 mL h$^{-1}$, while argon gas and hydrogen gas were flowed at 1000 sccm and 100 sccm, respectively. The total amount of pyridine injected was proportional to the mass of pristine CNT sponge with a ratio of 25 mL of pyridine to 1 g of CNT sponge. After 1 hour reaction, the quartz tube was naturally cooled under 200-sccm argon flow to room temperature.

Materials Characterization: The morphology and microstructure of the N/Fe-CNT sponge were characterized with SEM (FEI Quanta 600) and TEM (JEOL JEM-2010). The crystalline structure of the N/Fe-CNT sponge was studied by XRD measurement (Bruker-AXS D8 VARIO with Cu Kα X-ray) and XPS (Omicron XPS/UPS system with Argus detector, Mg Kα as the X-ray source) was conducted to reveal the chemical composition and environment of the N/Fe-CNT sponge. A survey scan was first recorded with 1.0 eV step size, followed by high-resolution scans of C 1s, N 1s, O 1s, and Fe 2p, using 0.05 eV step size. Raman spectroscopy was carried out on Horiba Jobin-Yvon LabRam with an excitation wavelength of 632.8 nm at room temperature.

MFC configuration and operation: The air bubbled two-chamber MFCs with a total volume of 40 mL (~20 mL each for cathode and anode) were used to test the performance of all cathodes (N/Fe-CNT sponges and Pt-CC). Cylindrical acrylic chambers with 3 cm in inner diameter and height were fabricated using a milling machine (MDX-40, Roland DGA). Carbon felt (1×1 cm$^2$) (Morgan, UK) was used as anode in all MFCs. Titanium wires were permanently glued to the electrodes using silver epoxy for electrical connection. After placing proton exchange membranes (Nafion 117™, Ion Power Inc.) with silicone rubber gaskets, the chambers were screwed tightly to prevent leakage. The anode chambers were inoculated with 20-vol % anaerobically activated sludge (Austin Wastewater Treatment Plant, Tex., USA) and 80-vol % medium solution containing PBS (100 mM) and autoclaved anaerobic nutrient mineral buffer (NMB, pH 7.0) (PBS:NMB=37:1 by vol) with sodium acetate (2 g L$^{-1}$). The cathode chambers were filled with 100 mM PBS as catholyte and continuously purged with air to supply oxygen. When the voltage dropped below ~50 mV, the anolyte was replaced with fresh one and then nitrogen gas was purged for 15 min to remove oxygen in the anode chambers. The anolyte was mixed using a magnetic stirrer (350 rpm) during the experiment. Cell voltages across an external resistor (1500Ω) were recorded every 2 min using a data acquisition system (National Instruments) via a LabView™ (National Instruments) interface. Polarization curves were obtained by varying the load resistor from 10 kΩ to 50Ω when the voltage was stable after several operation cycles. Power (P) curves were calculated using P=V×I with the recorded voltage (V) and measured current (I) with the load resistors. The current and power densities were normalized by the volume (20 mL) of the anode chamber.

Electrochemical measurements: The electrochemical measurements were conducted on an electrochemical workstation (CHI 604D, CH Instrument) with a three-electrode system (Ag/AgCl as a reference electrode, Pt wire as a counter electrode, and sample mounted glassy carbon electrode as a working electrode). To mount the samples on glassy carbon electrodes, catalyst ink was made by mixing 7-mg N/Fe-CNT sponge or Pt/C (20-wt % Pt, Fuel Cell Earth), 160-μL 5-wt % Nafion solution (Fuel Cell Earth), 170-μL ethanol (EMD Millipore, 92%-94%), and 670-μL deionized water, followed by sonication for 30 minutes. Then 5-μL catalyst ink was drop-casted on the glassy carbon electrode resulting in an area loading of 0.5 mg cm$^{-2}$. Both CV and RDE tests were performed in an O$_2$-saturated (bubbling oxygen gas for 30 minutes before each test) 50-mM PBS (pH=7.6) solution. CV tests were recorded in a potential range of −1.0~0.5 V with a scan rate of 0.1 V s$^{-1}$.

RDE tests were conducted at different rotating speeds (1,600 rpm to 850 rpm with 150 rpm interval) between −0.7 V and 0.4 V at 0.01 V s$^{-1}$ scan rate. Stability tests were performed by cycling between −0.5 V and 0.1 V with a scan rate of 0.1 V s$^{-1}$ for 20,000 cycles followed by RDE test at 1,000 rpm with a scan rate of 0.01 V s$^{-1}$.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures, to the extent they are not inconsistent with the explicit teachings of this specification.

What is claimed is:

1. A sponge-like porous self-assembled structure comprising graphitic carbon doped with a nitrogen source and a compound containing a transition metal, wherein the transition metal is attached to the surface of the structure and the transition metal is a catalyst and a point of growth of the structure.

2. The structure of claim 1, wherein the transition metal is coordinated with nitrogen.

3. The structure of claim 2, wherein the transition metal is iron.

4. The structure of claim 1, wherein the graphitic carbon is graphene.

5. The structure of claim 1, wherein the graphitic carbon is a carbon nanotube.

6. The structure of claim 5, wherein the carbon nanotube is a single-walled carbon nanotube or a multi-walled carbon nanotube.

7. The structure of claim 5, wherein the structure comprises a plurality of carbon nanotubes.

8. The structure of claim 7, wherein the carbon nanotobes are randomly oriented.

9. The structure of claim 7, wherein the carbon nanotubes are entangled.

10. The structure of claim 1, wherein the nitrogen source is selected from the group consisting of pyridine and polyaniline.

11. The structure of claim 1, wherein the compound containing a transition metal is ferrocene.

12. The structure of claim 1, wherein the structure catalyzes an oxygen reduction reaction.

13. The structure of claim 1, wherein the structure is stable in acidic and basic solutions.

14. The structure of claim 1, wherein the structure is an electrode of an electrochemical cell.

15. The structure of claim 1, wherein the porous structure comprises a membrane for gas diffusion.

* * * * *